United States Patent
Suriano et al.

(10) Patent No.: US 6,552,467 B1
(45) Date of Patent: Apr. 22, 2003

(54) INTEGRAL NOISE FILTER WITHIN BRUSH OF ELECTRIC MOTOR

(75) Inventors: Candace R. Suriano, Kettering, OH (US); John R. Suriano, Kettering, OH (US)

(73) Assignee: Valeo Electrical Systems, Inc., Auburn Hills, MI (US)

( * ) Notice: Subject to any disclaimer, the term of this patent is extended or adjusted under 35 U.S.C. 154(b) by 0 days.

(21) Appl. No.: 09/553,832

(22) Filed: Apr. 21, 2000

(51) Int. Cl.[7] ............................................... H02K 13/00
(52) U.S. Cl. ...................... 310/249; 310/239
(58) Field of Search .................... 310/51, 239, 233, 310/249, 242

(56) References Cited

U.S. PATENT DOCUMENTS

| | | | | |
|---|---|---|---|---|
| 2,206,366 A | | 7/1940 | Redmond | |
| 2,590,796 A | * | 3/1952 | Schaffer | 310/246 |
| 3,523,288 A | * | 8/1970 | Thompson | 340/648 |
| 3,681,635 A | * | 8/1972 | Bayer | 310/248 |
| 4,172,988 A | * | 10/1979 | Lowther | 310/245 |
| 4,316,186 A | * | 2/1982 | Purdy et al. | 340/648 |
| 4,329,605 A | * | 5/1982 | Angi et al. | 310/68 R |
| 5,208,499 A | * | 5/1993 | Barber et al. | 310/51 |
| 5,231,322 A | | 7/1993 | Richards et al. | |
| 5,420,492 A | | 5/1995 | Sood et al. | |
| 5,446,324 A | | 8/1995 | Onodera | |
| 5,485,049 A | | 1/1996 | Shannon et al. | |
| 5,610,467 A | | 3/1997 | Shiah et al. | |
| 5,712,522 A | | 1/1998 | Nimi | |
| 5,821,662 A | | 10/1998 | Kajino et al. | |
| 5,852,352 A | | 12/1998 | Suriano | |

FOREIGN PATENT DOCUMENTS

| | | |
|---|---|---|
| GB | 813649 | 5/1959 |
| JP | 3-71582 | 8/1989 |
| JP | 6-225500 | 8/1994 |

* cited by examiner

Primary Examiner—Nestor Ramirez
Assistant Examiner—Karen Addison
(74) Attorney, Agent, or Firm—Jacox Meckstroth & Jenkins

(57) ABSTRACT

A noise-suppression system for brush-type electric motors in vehicles. A capacitor, together with an inductor, are integrally constructed into a carbon brush, forming an LC filter.

13 Claims, 22 Drawing Sheets

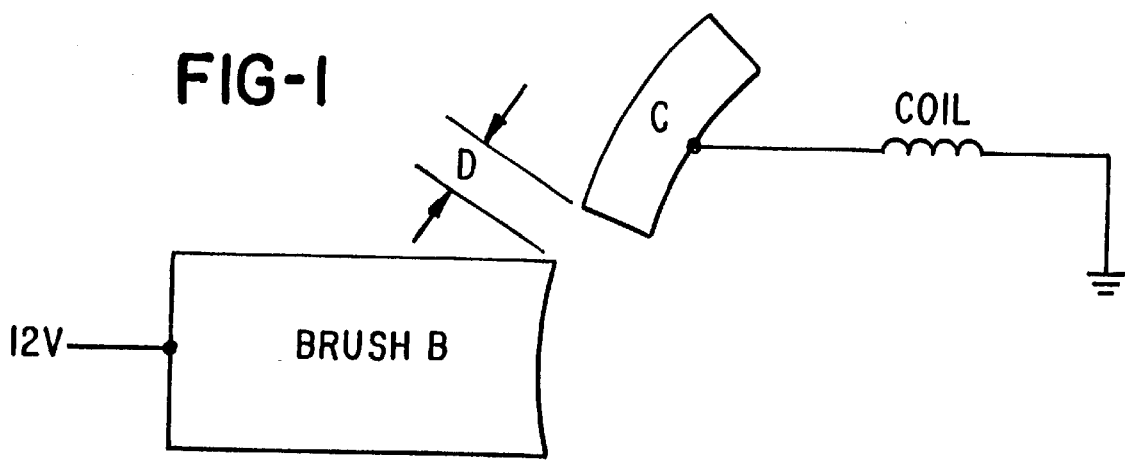
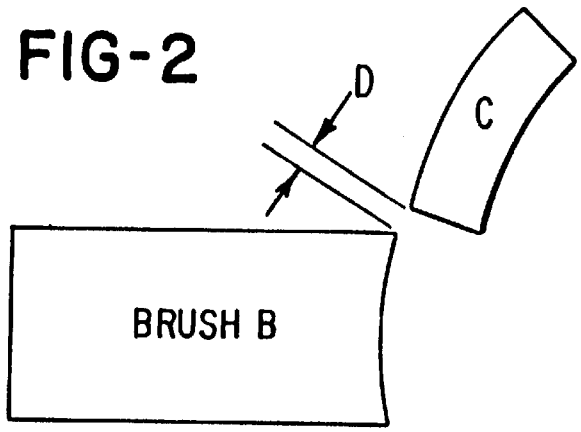
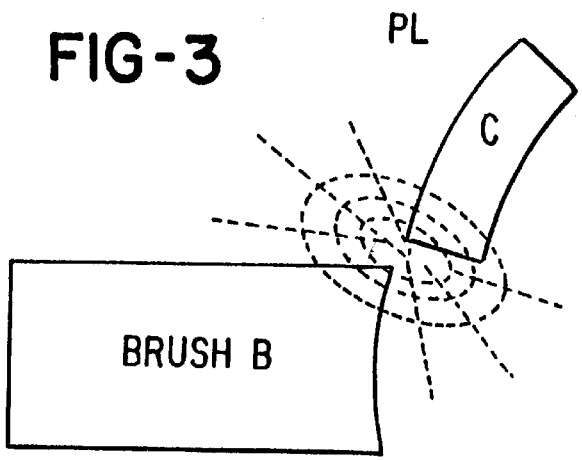

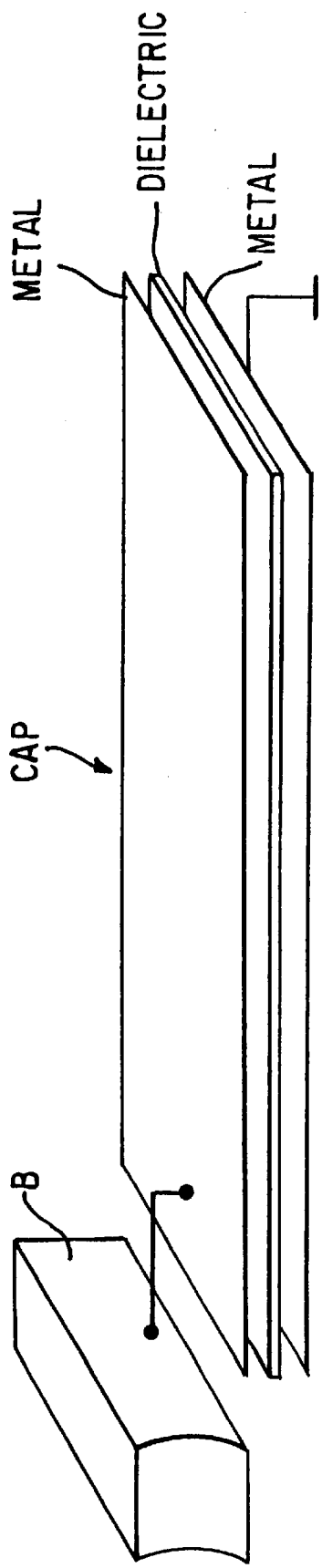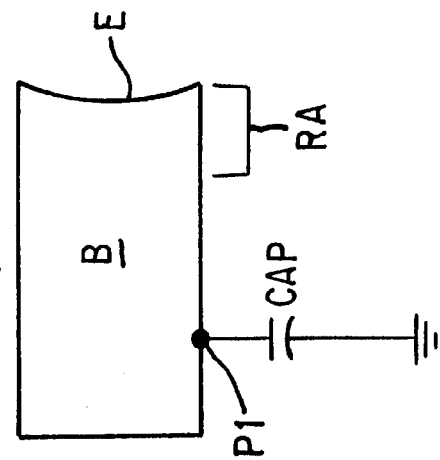

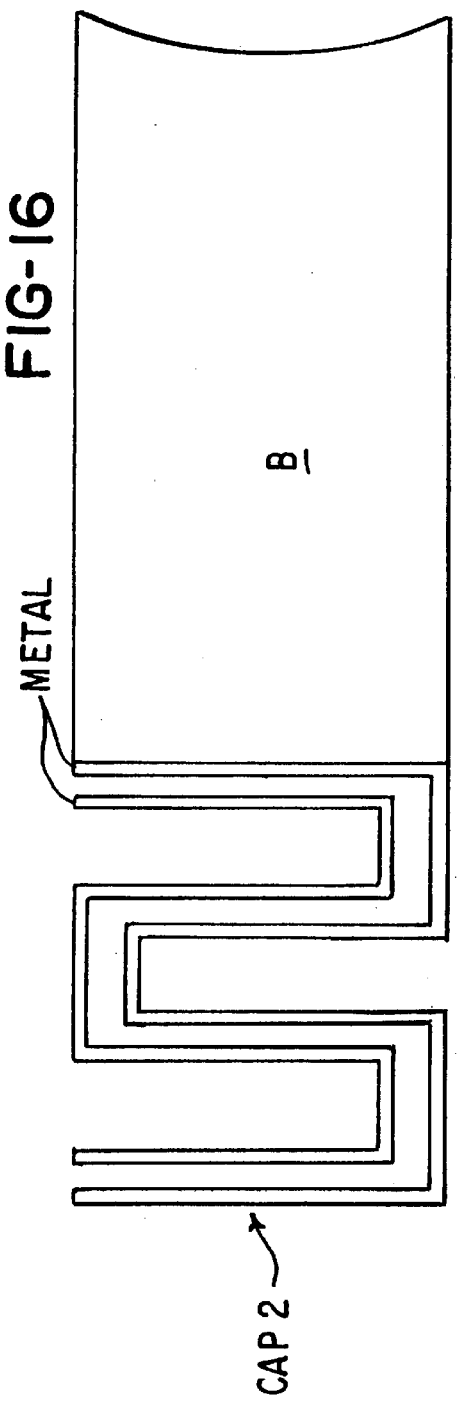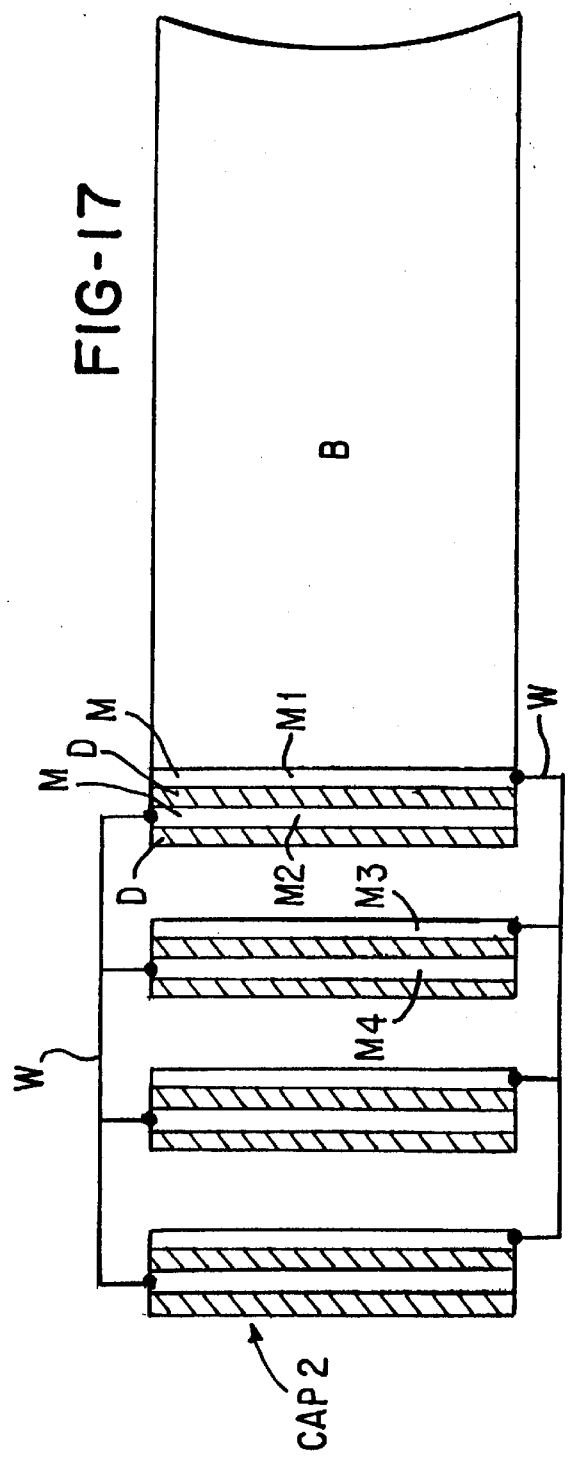

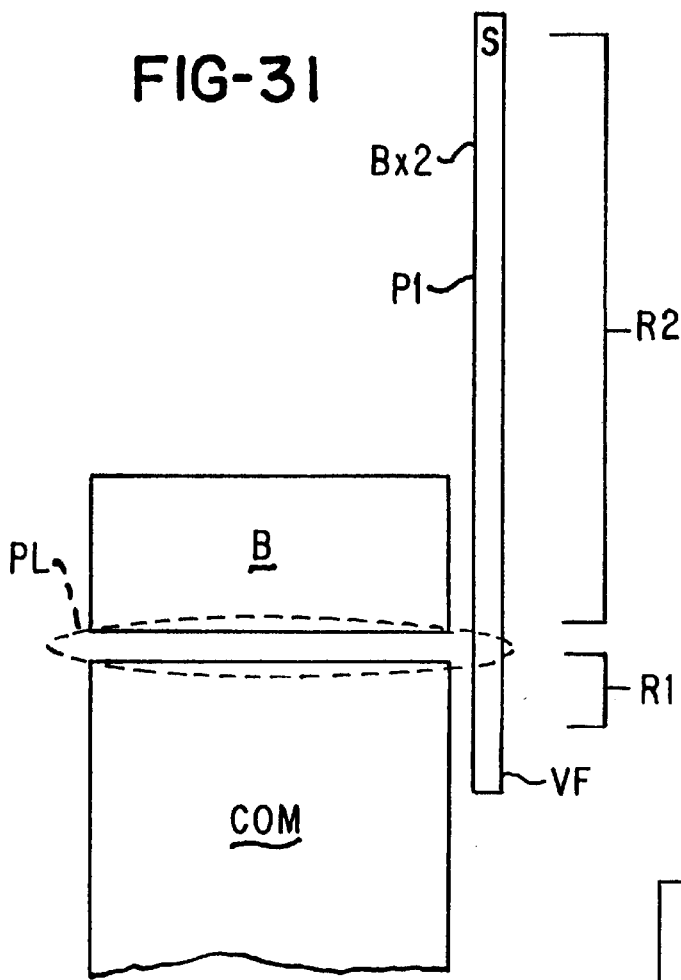
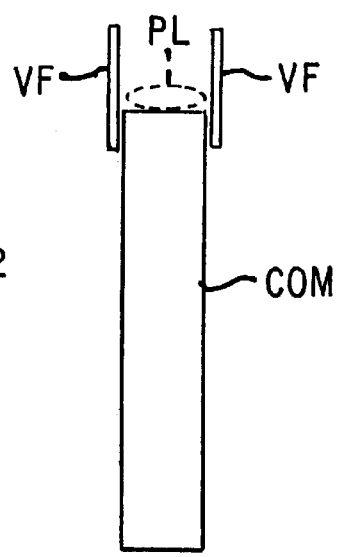
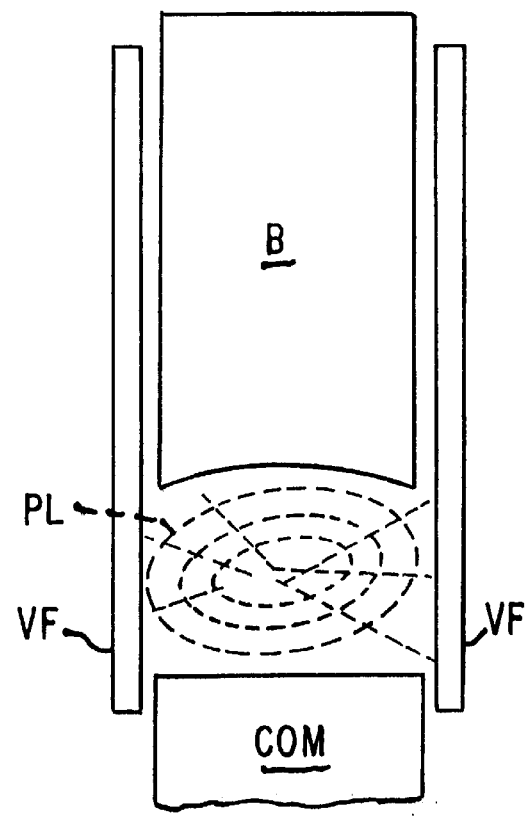
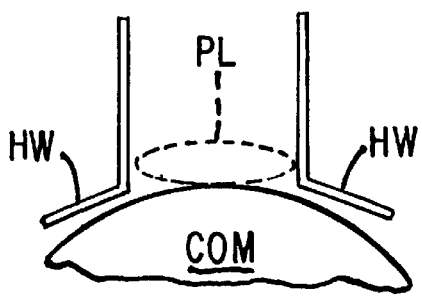

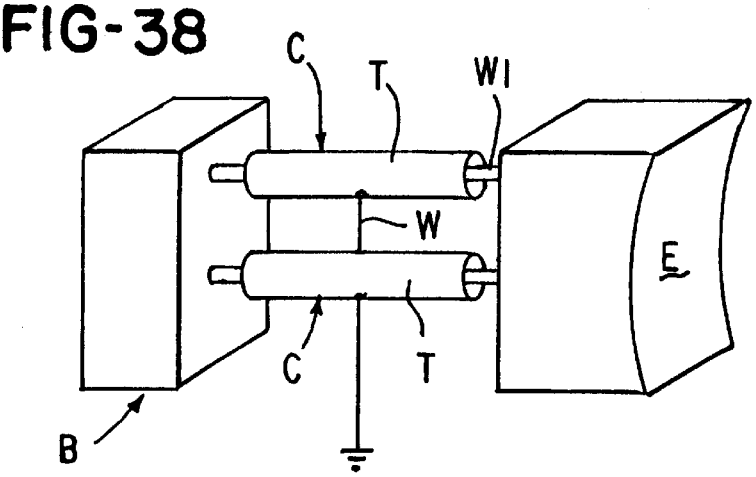
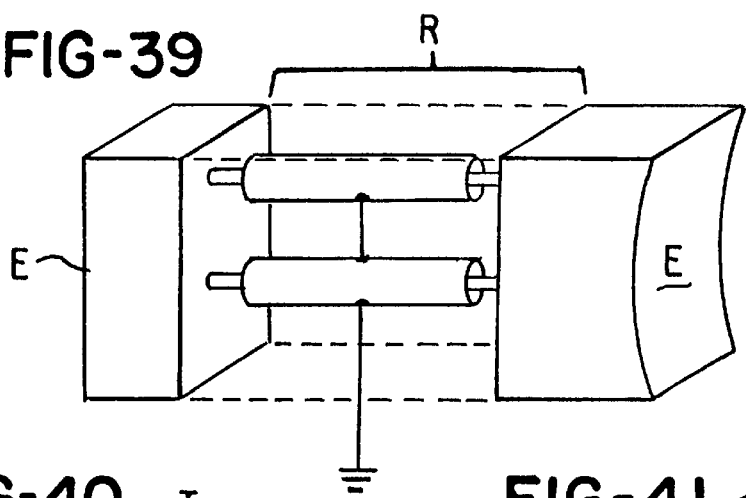
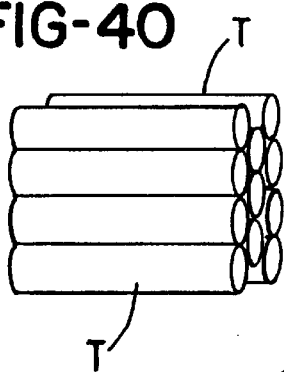
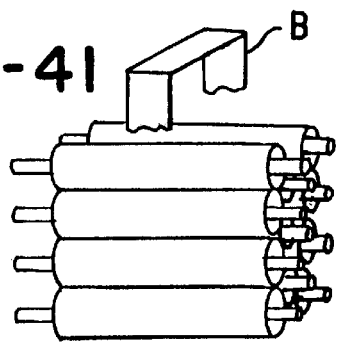
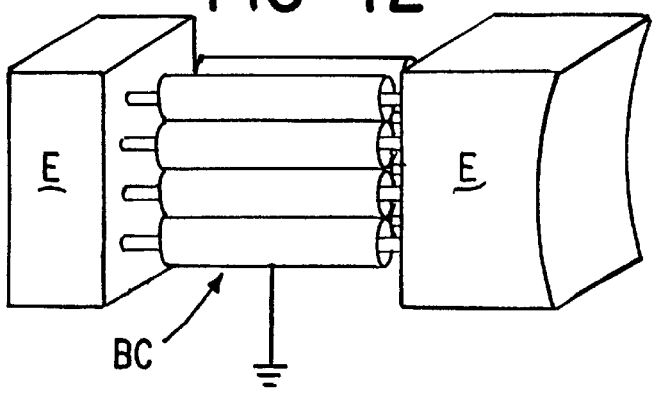

BRUSH  FERRITE  BRUSH

BRUSH  FERRITE  BRUSH

BRUSH  FERRITE  BRUSH

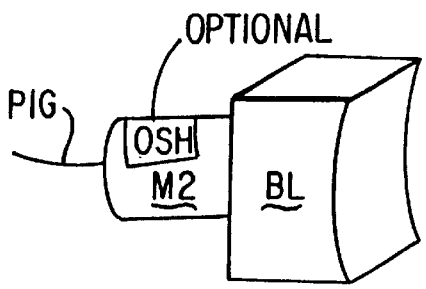
FIG-64
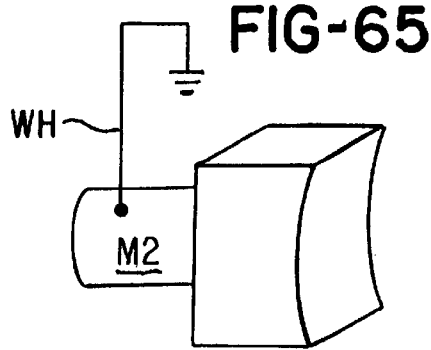
FIG-65
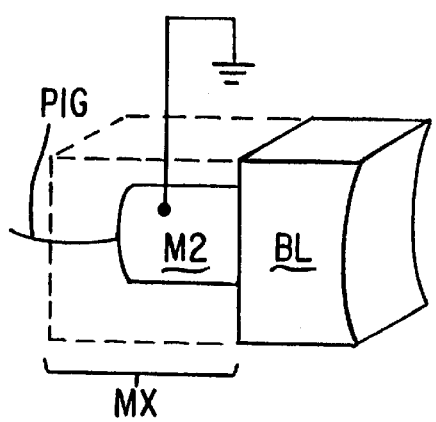
FIG-66
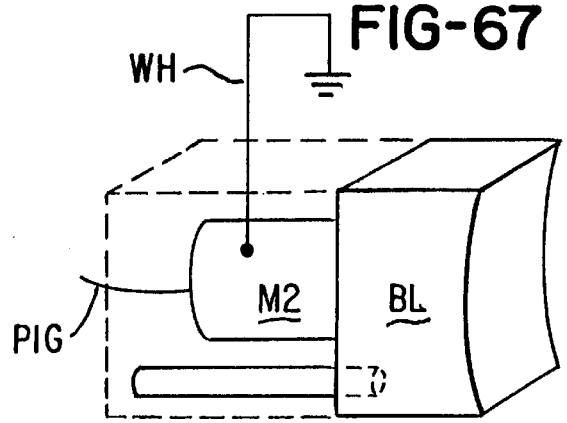
FIG-67
FIG-68

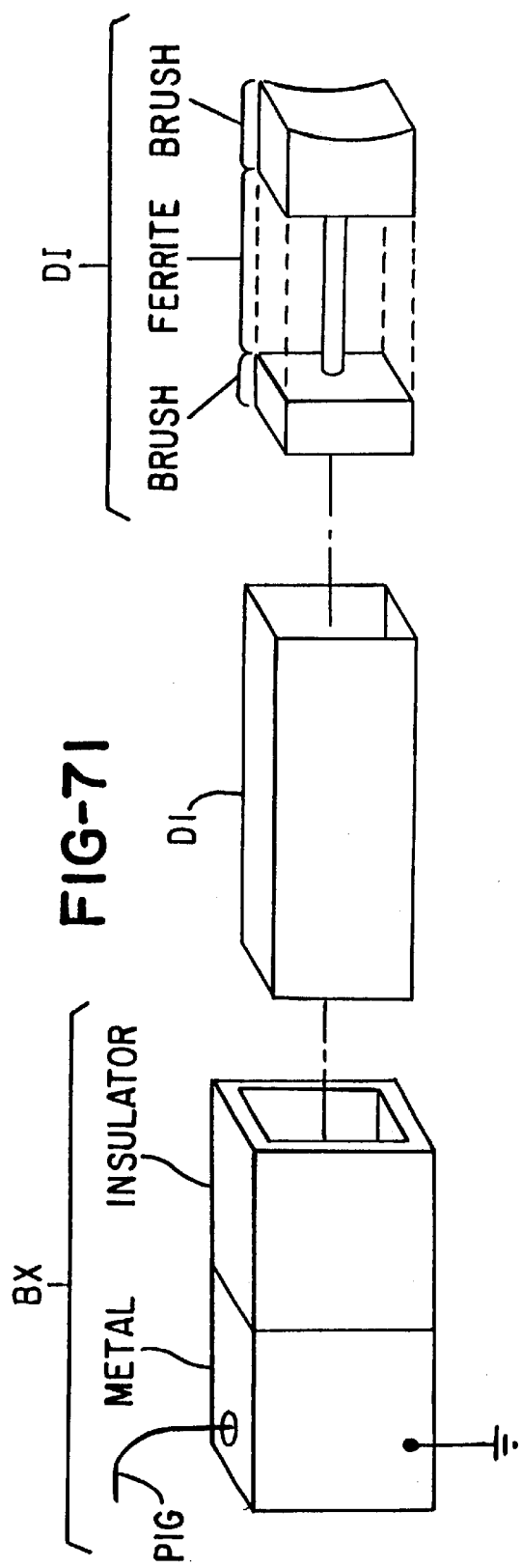
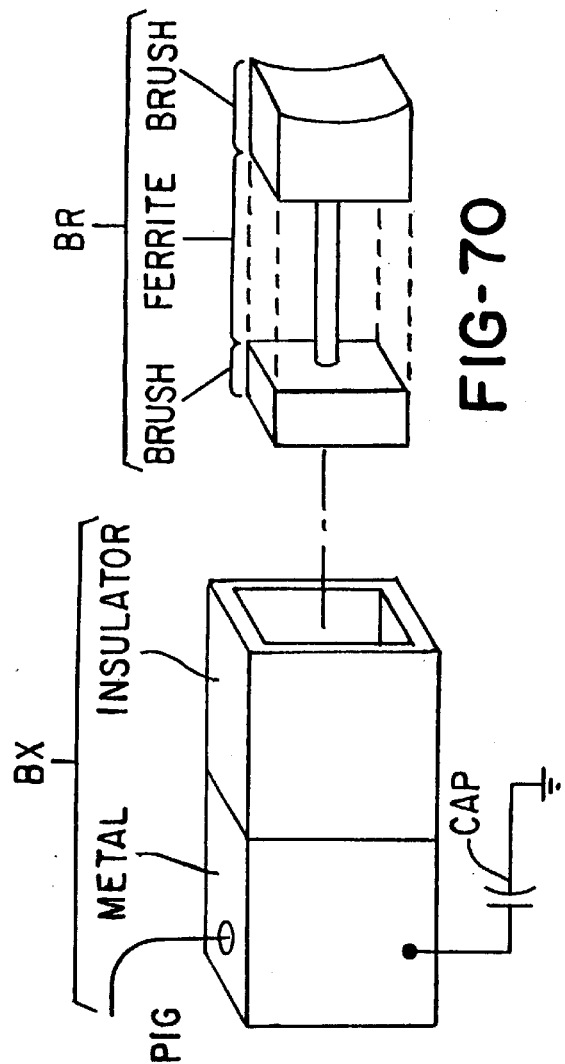
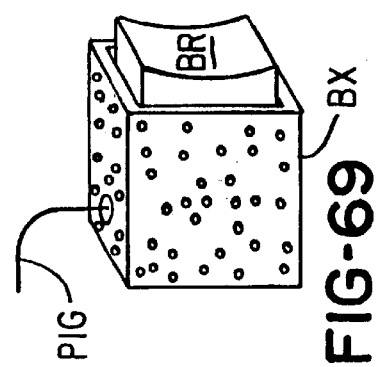

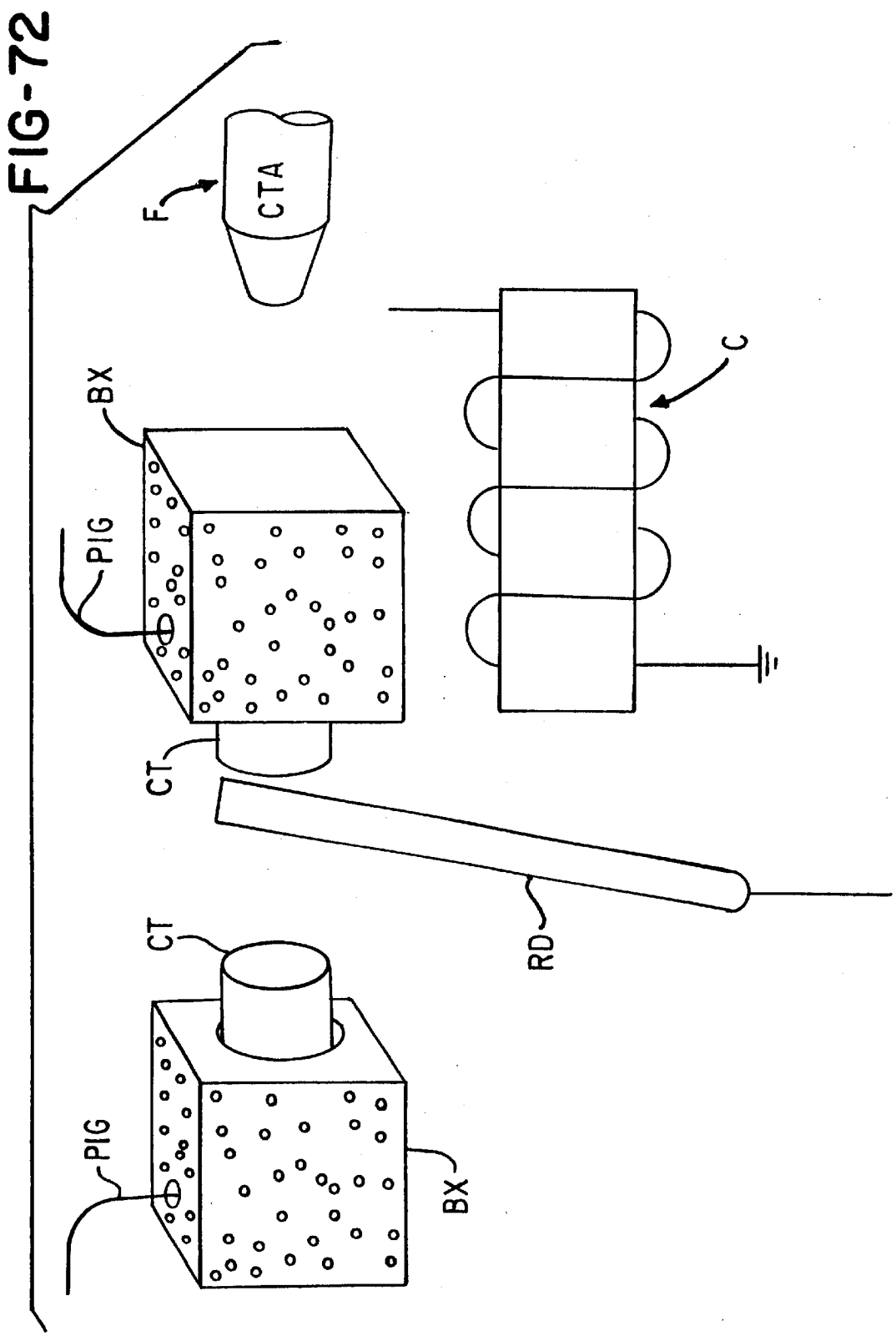

INTEGRAL NOISE FILTER WITHIN BRUSH OF ELECTRIC MOTOR

BACKGROUND OF THE INVENTION

1. Field of the Invention

The invention concerns a noise-suppression capacitor which is integrally manufactured within or upon a brush in an electric motor.

2. Related Art

Brush-type electric motors generate electrical arcing when the brushes contact the commutator. This arcing acts as a source of electrical noise and can interfere with electronic devices. For example, automobiles contain numerous motors, such as in heating and cooling fans, seat-adjustment motors, window motors, and so on. The electrical noise can interfere with cellular telephones, global navigation-positioning systems, entertainment systems, and other devices.

As the numbers and types of electronic devices used in automobiles increases, the problems created by the noise is expected to also increase.

SUMMARY OF THE INVENTION

In one form of the invention, a brush for an electric motor contains a series inductor and a shunt capacitor integrally formed into the brush.

An object of the invention is to provide an improved electric motor.

In one aspect, this invention comprises a brush for an electric motor, comprising a block for contacting a commutator, a plurality of conductors extending from the block, and a conductive sheath surrounding each conductor and connected to ground, wherein each sheath-conductor pair forms a capacitor.

In another aspect, this invention comprises a brush for an electric motor, comprising a contact for contacting a commutator in the motor, an inductor, connecting with a contact, and a block of material which supports a contact and encases said inductor.

In still another aspect, this invention comprises a brush for an electric motor, comprising a contract for contacting a commutator in the motor, an inductor, connecting with said contact, a block of material which supports a contact and encases an inductor and a capacitor which connects between a contact and an external lead and is encased in a block.

In yet another aspect, this invention comprises a brush for an electric motor, consisting essentially of a contact for contacting a commutator, a power connector (PIG), an LC noise filter for deterring noise signals received by the contact from reacting the power connector, and a matrix supporting the contact, power connector, and LC noise filter.

In still another aspect, this invention comprises a method of constructing a brush for a motor, comprising the steps of providing a contact for contacting a commutator, and attaching a filter, comprising an inductor and a capacitor, to the contact in a manner which precludes usage either the inductor or the capacitor individually in another radio-frequency circuit.

In yet another aspect, this invention comprises a brush assembly for an electric motor, comprising a hollow brush box containing ferrite material distributed within the material of which the box is constructed, and a brush slidably contained within the box.

In yet another aspect, this invention comprises a brush assembly for an electric motor, comprising a generally dumbbell-shaped brush, having two ends of large diameter, connected by a shaft of small diameter, a mass of ferrite-bearing material surrounding the shaft, a brush box within which the brush is slidably engaged, which includes a conductive region which is capacitively coupled to ground, and an insulative region.

In still another aspect, this invention comprises a brush assembly for an electric motor, comprising a generally dumbbell-shaped brush, having two ends of large diameter, connected by a shaft of small diameter, a mass of ferrite-bearing material surrounding the shaft, a brush box within which the brush is slidably engaged, which includes a conductive region, and an insulative region.

A further object of the invention is to provide an electric motor in which brushes contain filter inductors.

A further object of the invention is to provide a brush for an electric motor which contains a filter inductor integrally manufactured therein, or attached thereto.

A yet further object of the invention is to provide a brush for an electric motor which contains both a filter inductor and a filter capacitor, integrally manufactured therein.

Further objects and advantages of the invention will be apparent from the following description, the accompanying drawings, and the appended claims.

BRIEF DESCRIPTION OF THE DRAWINGS

FIGS. 1–3 illustrate a proposed mechanism explaining the origin of arcing in a brush-type electric motor;

FIG. 7 illustrates a shunt capacitor Cap connected to a brush B;

FIG. 8 illustrates, in principle, how the capacitor Cap may be constructed;

FIG. 16 illustrates a serpentine capacitor Cap2, attached to the end of a brush B. Insulating layers are represented by space;

FIG. 17 illustrates the electrical equivalent circuit of the capacitor Cap2 of FIG. 16;

FIG. 31 is a representation of the apparatus of FIG. 30, showing regions R1 and R2 of surface S of FIG. 30;

FIG. 32 is another representation of the apparatus of FIG. 30;

FIG. 33 illustrates a conception of how the plasma PL is contained by the apparatus of FIG. 30;

FIG. 34 illustrates how horizontal wings HW block radiation from the plasma PL;

FIG. 38 illustrates another form of the invention;

FIG. 39 illustrates the apparatus of FIG. 38, but with a solid polymer added in region R;

FIGS. 40–42 illustrate an approach to constructing the apparatus of FIG. 38;

FIGS. 58–67 illustrate one sequence of steps usable in constructing the apparatus of FIG. 57;

FIG. 68 illustrates a coil of wire, used for computing inductance;

FIGS. 69, 70, and 71 illustrate different forms of the invention; and

FIG. 72 illustrates principles of the invention applied to relay contacts.

DETAILED DESCRIPTION OF THE INVENTION

Simplified Explanation of Electrical Arcing

This description will begin with an explanation of arcing within a brush-type electric motor. Because of the complexity of the physics involved, this explanation is necessarily a simplification. It is a collection of simplified hypotheses, and is used as a starting point for identifying, if possible, the sources of the noise mentioned earlier.

FIG. 1 is a schematic of an electrical circuit in which a brush B is involved. A coil, representing a coil within the rotor of a motor, is connected between a commutator contact C and ground, through other coils, commutator bars, and brushes. A brush B is connected to a 12-volt source 12V, representing a battery in an automobile. The brush B and the contact C are separated by distance D.

As the motor (not shown) which contains the brush B rotates, the contact C approaches the brush B, and the distance D decreases, as shown in FIG. 2. This decrease in distance serves to increase the electric field present between the brush B and the contact C.

That is, the potential difference between brush B and contact C remains at 12 volts, so long as the brush B and contact C are physically separated. However, the electric field strength equals the potential difference divided by the distance between those two components. When, for example, the distance D in FIG. 2 equals 0.001 inch, the electric field strength becomes 12 volts/0.001 inch, or 12,000 volts per inch, which corresponds to about 500,000 volts per meter.

Eventually, as the distance D diminishes, the electric field will exceed the dielectric breakdown strength of the air located between the brush B and the contact C. At that time, arcing occurs, as indicated by the plasma PL in FIG. 3.

Figure 4:
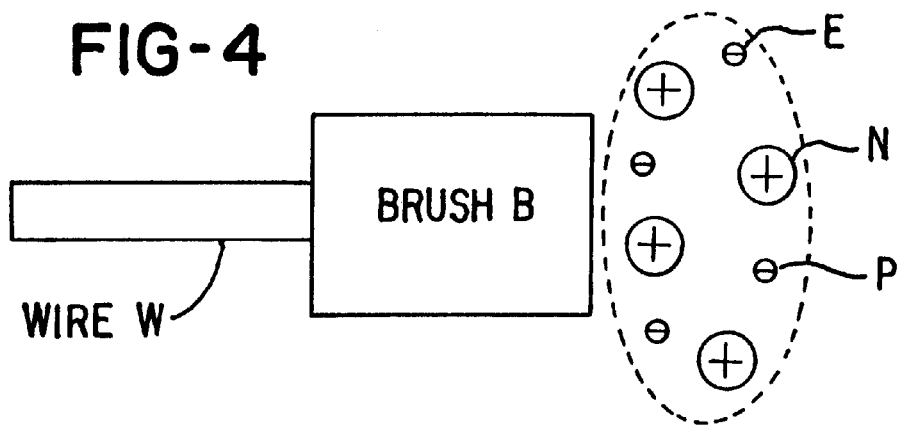
FIG. 4 represents a plasma P.

The plasma PL is generated because the electric field (not shown) strips away electrons E in FIG. 4 from the nuclei N of the air molecules: the air becomes ionized into a plasma state. (The wire W represents the electrical lead or "pigtail" which supplies the brush B with current.) The plasma is believed to generate the electrical noise in question, through two primary mechanisms.

In one mechanism, the particles N and E in FIG. 4 vibrate because of their thermal energy. Arrow A in FIG. 5 indicates this vibration. Further, some Joule heating of the plasma PL occurs, because of the current passing through the plasma, which increases the thermal energy further.

Figure 5:
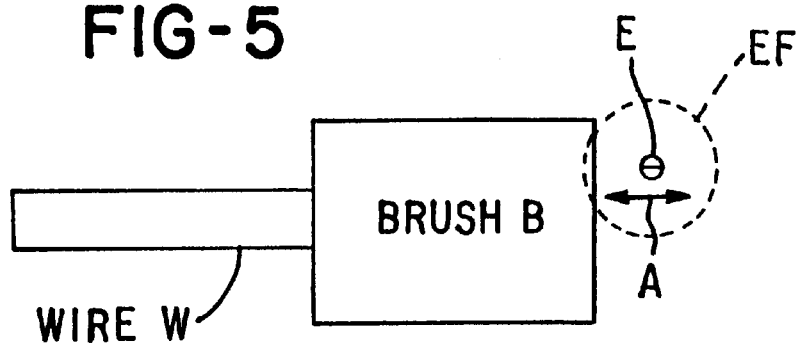
FIGS. 5 and 6 represent two mechanisms by which the plasma P of FIG. 4 produces electrical noise.

The electron E shown in FIG. 5 is surrounded by an electric field EF. When the electron E approaches the brush B during its vibration, the electric field EF penetrates the brush B. That penetrating field EF disturbs the electrons within the brush B.

Restated, the plasma P acts as a source of electrical noise because it contains charged particles which are vibrating because of thermal energy. The moving electric fields associated with the vibrating charged particles disturb the electrons within the brush B. The disturbances continue to the wire W connected to the brush B, thereby injecting noise into the system (not shown) connected to the wire W.

This process repeats when the commutator bar C breaks contact with brush B, disrupting current flow to the coil.

Figure 6:
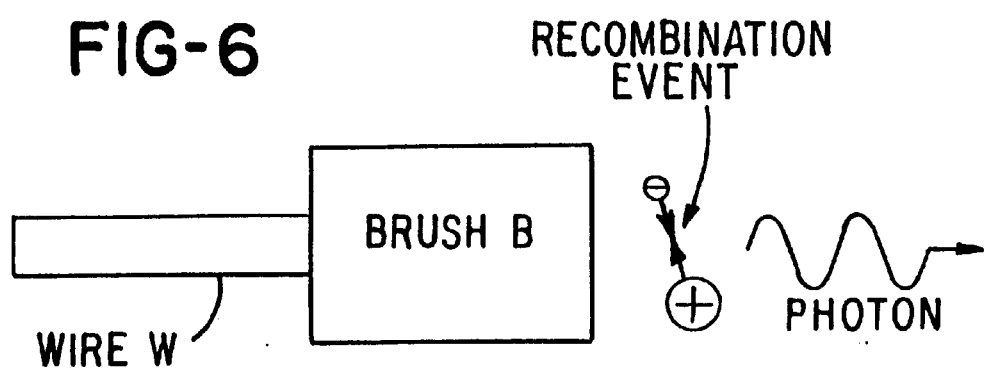

The second noise-producing mechanism is radiation. As indicated in FIG. 6, electrons E re-combine with nuclei N. Whenever an electron E and an ionized nucleus N re-combine, energy is released in the form of a photon. The photon energy certainly lies in the visible range: the visible arcing is attributed to photons produced by such events. In addition, it is likely that the re-combinations also produce energy in the radio-frequency range, and others.

This radiation travels outward, through the air. If the radiation passes near the brush B and wire W, the latter can act as antennas. As antennas, they pick up noise from the radiation, and the wire W delivers the noise to the remainder of the electrical system (not shown).

Various Forms of Invention

FIG. 7 illustrates one form of the invention. A capacitor Cap is connected between the brush B and ground. It is desirable to connect the capacitor Cap as close as possible to the end E of the brush at which the plasma (not shown) exists. However, the connection point P1 cannot, in general, be placed directly at end E, because the brush is consumed during use, thereby causing the end E to disappear. That is, for example, region RA will be worn away, and disappear, during the operating life of the brush B.

One line of reasoning which justifies addition of the capacitor is that the plasma is viewed as a signal source located at end E in FIG. 7. That source delivers sinusoidal signals of numerous frequencies, particularly in the radio-frequency range.

If these signals are offered a short-circuit path to ground, through capacitor Cap, they will preferentially take that short-circuit path, as opposed to taking the alternative path through the brush B and wire W. The latter path will cause them to enter the electrical system, which is not desired.

However, a direct-current short-circuit path cannot be provided from the plasma to ground. As FIG. 3 indicates, the plasma P is located at the end of the brush B. As FIG. 1 indicates, the brush B is held at 12 volts. If the tip of the brush B were connected to ground by a DC path, such as a tungsten wire, that grounding would, in effect, short the 12-volt source to ground. That shorting cannot be allowed, because a huge current will flow through the short circuit.

Instead of providing a DC short to ground, the capacitor Cap in FIG. 7 is used, which provides a low-impedance AC path to ground. But the capacitor Cap acts as an open circuit to DC and blocks DC current.

The AC impedance presented by the capacitor equals 1/jwC, wherein j is the imaginary operator, w is radian frequency, and C is the value of the capacitance. For example, assume a given noise frequency at 1.0 Megahertz. That corresponds to a radian frequency of 2×PI×1.0 Megahertz or about 6 Mega-radians/sec.

If the capacitor Cap in FIG. 7 has a value of 1.0 micro-Farad (i.e., one millionth of a Farad), then the impedance equals 1/(2×PI×1.0E6)×(1.0E-6), or 1/(2×PI) ohms, which equals about ⅙ ohm (imaginary). That impedance is "small" and, for many purposes, can be considered a short circuit.

Figure 9:
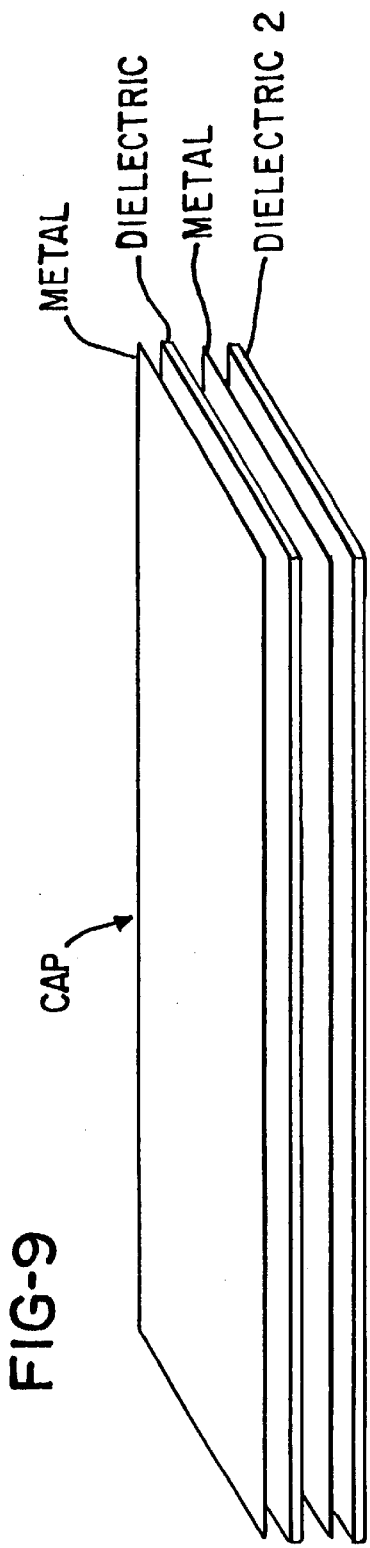
FIG. 9 illustrates the capacitor Cap of FIG. 8, but with an added dielectric layer, to facilitate the rolling of FIGS. 10 and 11.
Figure 10:
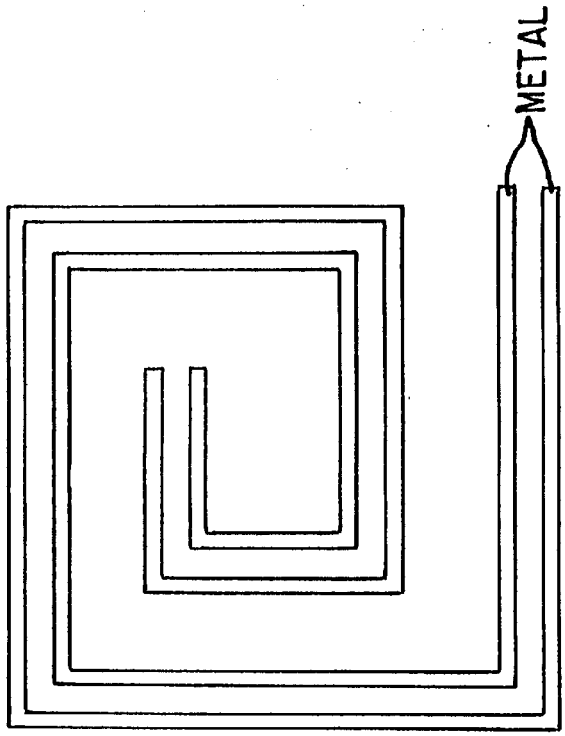
FIG. 10 illustrates how the two metal layers of FIGS. 8 and 9 can be rolled into a compact shape, around a brush (not shown)

The capacitor Cap can be constructed as shown in FIGS. 8–10. FIG. 8 shows two metal films, separated by a dielectric. One film is connected to the brush B and the other is connected to ground.

Figure 11:
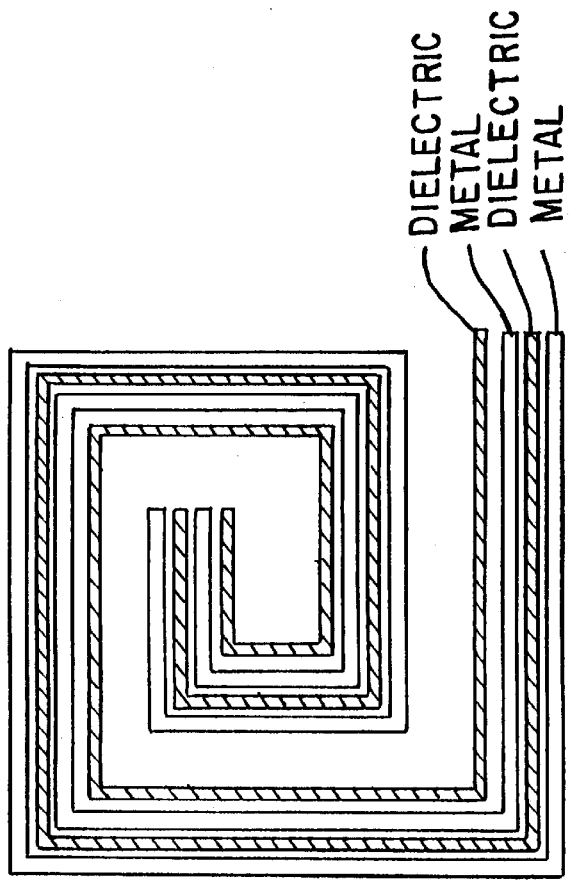
FIG. 11 shows the apparatus of FIG. 10, but includes the two dielectric layers of FIG. 9, for completeness.

If a second dielectric, DIELECTRIC 2 in FIG. 9 is added, then the capacitor can be rolled into a smaller package, as indicated in FIG. 10. In FIG. 10, the dielectrics are represented by the spaces between the metal films. The dielectrics are explicitly shown in FIG. 11.

Figure 12:
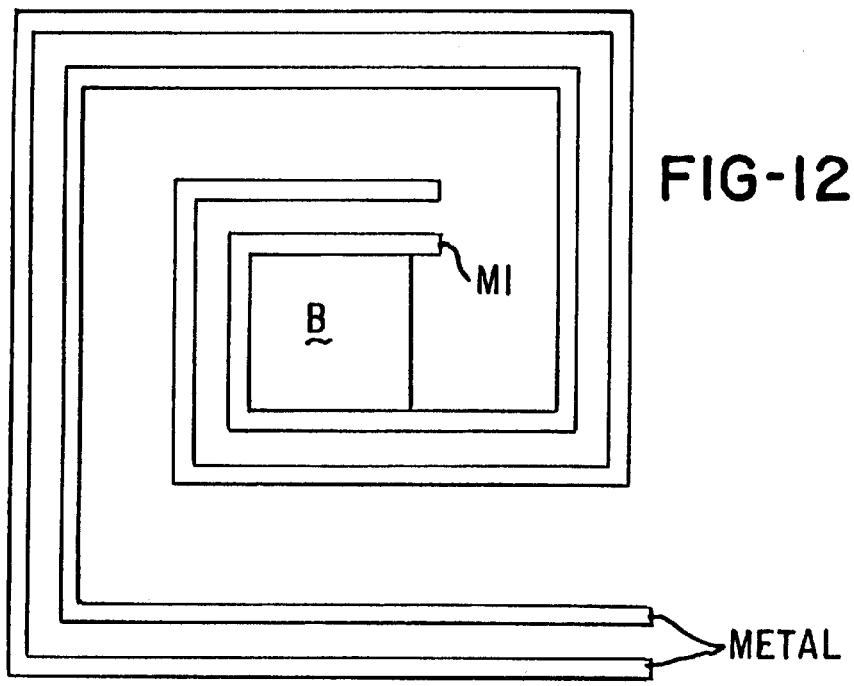
FIG. 12 shows the rolled capacitor of FIG. 10, with a brush B inside.

The films are wrapped around the brush B, as indicated in FIG. 12. The brush B is in physical contact with one of the metal films, M1, as indicated.

Figure 13:
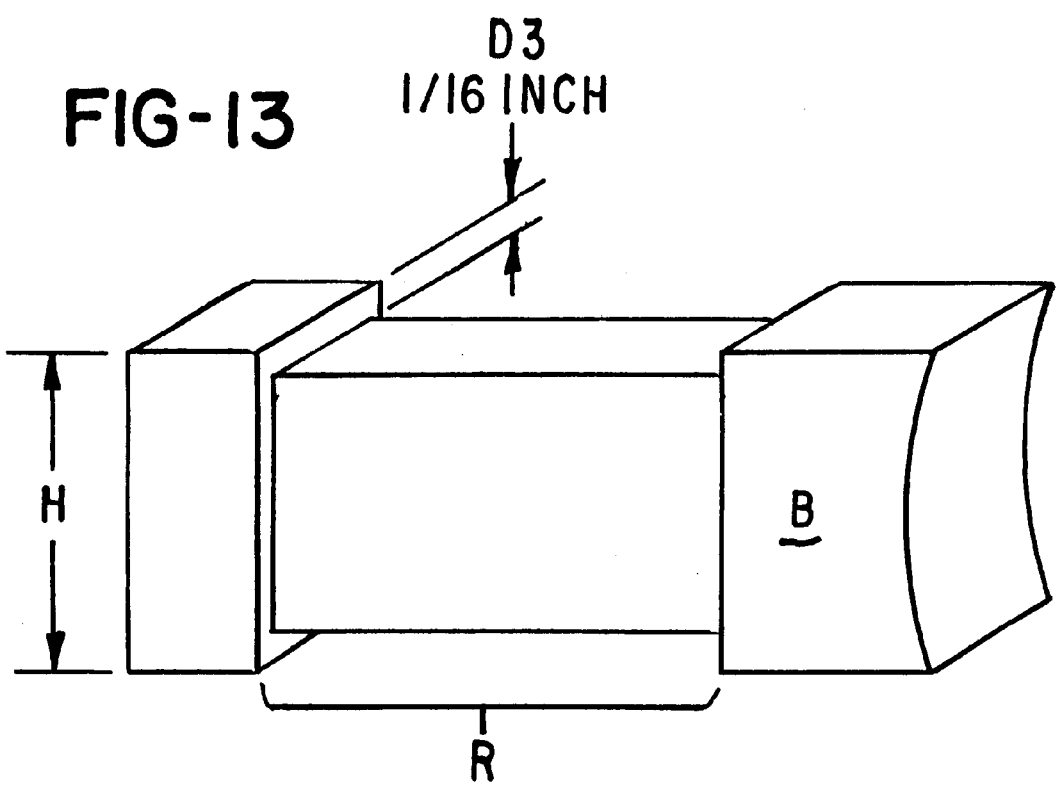
FIGS. 13 and 14 show annular recesses R which can be constructed into the brush B, for containing the rolled capacitor of FIGS. 10–12.

This approach can generate capacitors having a metal plate area which exceeds that of the surface area of the brush B. A numerical example will illustrate. In FIG. 13, an annular recess R is cut into the brush B. It may be preferable to make the bottom of the recess R cylindrical in cross-section, as in FIG. 14.

Figure 15:
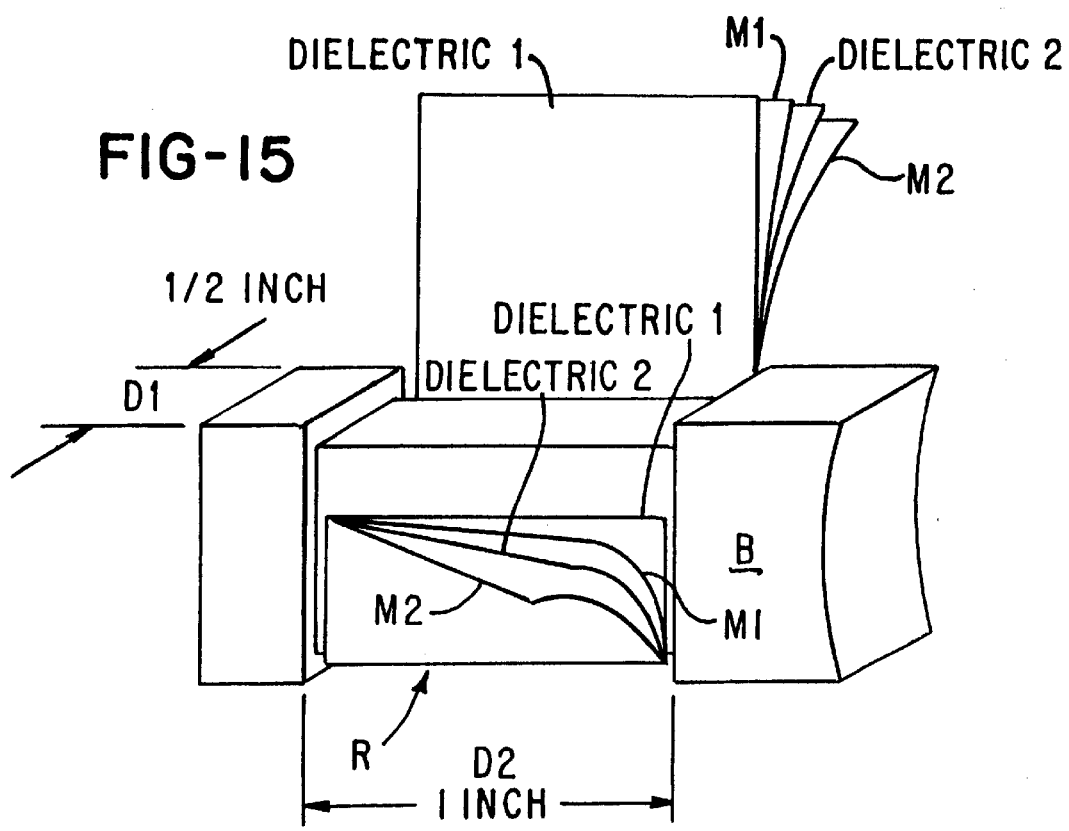
FIG. 15 shows the four layers of FIG. 9, rolled about a brush B, within the recess R of FIG. 13.

Four layers of film, indicated in FIG. 15, are wrapped around the brush, within the recess R. These layers are metal M2, dielectric D2, metal M1, and dielectric D1. A protective coating (not shown), such as an epoxy or potting compound, can be added after installation of the layers of film, to coat the surface, and make it flush with that of the rest of the brush B.

Given the dimensions indicated, each face of the recess in FIG. 15 has an area of about ½ square inch. Thus, since a single wrap will cover four faces, the single wrap will possess an area of 2 square inches. If each layer of film is 1.0 mil thick, one mil being ¹⁄₁,₀₀₀ inch, then the four layers together are 4.0 mils thick.

The depth of the recess R indicated in FIG. 13 is ¹⁄₁₆ inch, which corresponds to about 60 mils. Consequently, about 15 wraps, each 4 mils thick, can be placed into the recess R. If each wrap, as stated, contains an area of 2 square inches, then the total area is 30 square inches.

The formula for the capacitance of a parallel-plate capacitor is $$C=eA/t$$

wherein

C is the capacitance,

A is the area, t is the distance between plates, and e is the dielectric constant.

Here, the ratio A/t is 30/0.001, or 30,000 inches. Dividing this by 39, to convert approximately to meters, yields 770. The dielectric constant for air is about 9 pico-Farads per meter.

Thus, if air were the dielectric, this capacitor would have a value of 770×9 pico-Farads, or about 6900 pico-Farads, corresponding to about 0.007 micro-farads.

Materials having a dielectric constant larger than air, and ten to 100 times larger, are readily available. That is, the parameter e in the equation above can be easily increased by a factor of 10 to 100. Thus, this value of 0.007 micro-Farads can easily be increased to 0.07 or 0.7 micro-Farads by suitable choice of dielectrics D1 and D2.

It is, of course, recognized that brushes B and recesses R having dimensions other than those shown in FIG. 15 are possible. The invention explicitly teaches all combinations of the following dimensions D1, D2, and D3, shown in FIG. 15.

D1 (width of brush B): all dimensions from ⅛ inch to 1.0 inch.

D2 (length of recess R): all dimensions from ⅛ inch to 3.0 inches.

D3 (depth of recess R): all dimensions from ¹⁄₁₀₀ inch (i.e., ten mils) to ½ inch. Further, a recess of zero depth is taught in which case the films shown in FIG. 15 would be wrapped around the brush B, and would not be recessed. Further still, the depth D3 may be as much as 40 percent of the dimension of the brush in the direction in which the depth penetrates. For example, in FIG. 13, dimension H represents height. If H equals 1,000 mils, then the depth D3 may reach 400 mils, which is 40 percent.

In another form of the invention, the capacitor is attached to the end of the brush B, as in FIG. 16. Further, the layers are configured into a serpentine shape, to increase the total area. (Dielectric layers are not shown in FIG. 16.) Alternately, a single pair of layers can be used, without the serpentine configuration.

FIG. 17 illustrates an equivalent electrical circuit for FIG. 16. Four sets of layers, each containing two layers of metal film M separated by dielectric layers D, are connected as indicated by the wires W. With these connections, two sets of metal film layers are generated. Specifically, metal layers M1 and M3 are connected into one set, and metal layers M2 and M4 are connected into another set.

Figure 37:
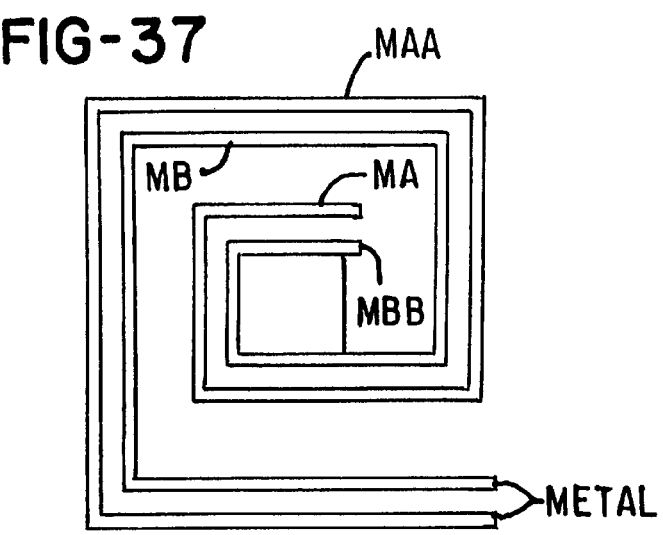
FIG. 37 illustrates how the apparatus of FIG. 10 does not act as capacitors in series.

This same concept of two sets of layers can be applied to FIG. 10. For example, in FIG. 37, layers MA and MAA represent one set, while layers MB and MBB represent another.

In FIG. 17, the layer M1 adjacent the brush B may be eliminated, since the brush B can act as the plate.

Figure 18:
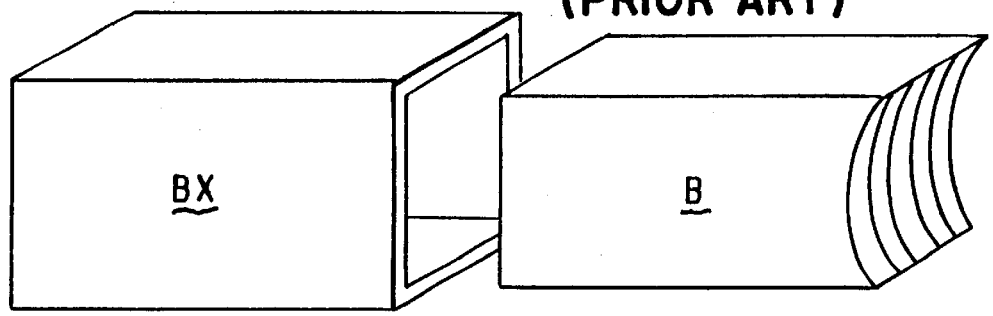
FIG. 18 illustrates a prior-art brush B and its box Bx, which supports it within a motor (not shown)
Figure 19:
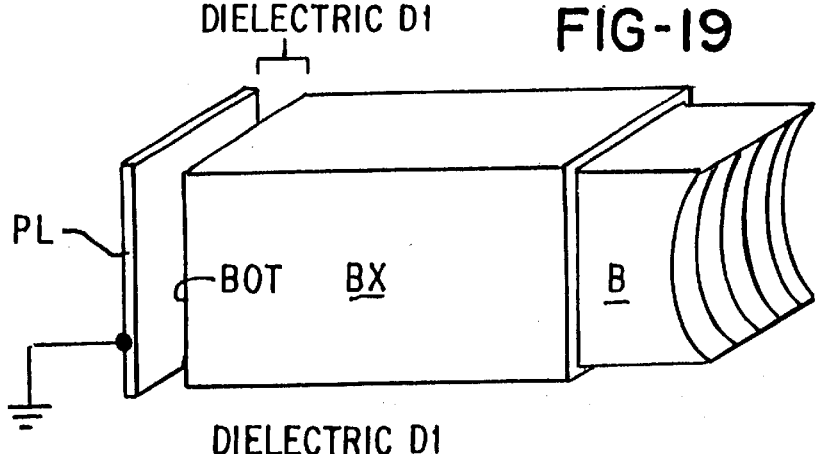
FIG. 19 illustrates a plate PL which cooperates with the box Bx to form a capacitor.

FIG. 18 shows a brush B together with its support box Bx. FIG. 19 shows the brush B assembled into the box Bx, together with an added plate PL. The plate PL acts as one plate of a capacitor, and the bottom BOT of the box Bx acts as the other plate. A dielectric DI is positioned between the plates, as indicated.

Figure 20:
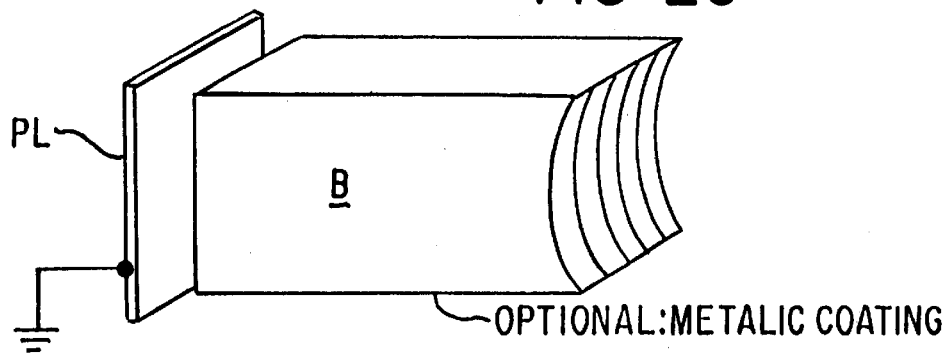
FIG. 20 illustrates a plate PL cooperating directly with a surface of the brush B to form a capacitor.

In FIG. 20, the support system for the brush B is not shown. Plate PL acts as one plate of a capacitor, while a surface of the brush B, being conductive, acts as the other plate. Optionally, as indicated, the surface of the brush B may be given a metallic, or conductive coating.

Figure 21:
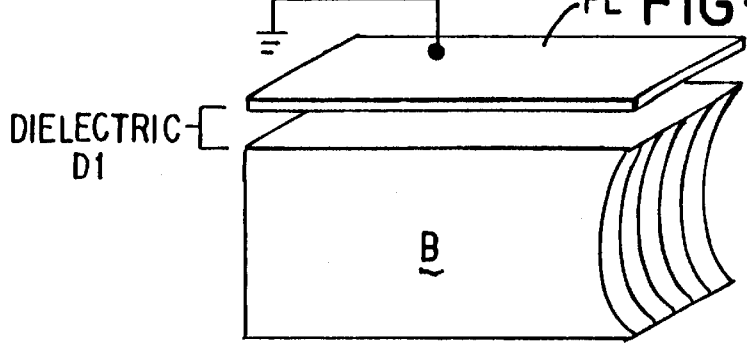
FIG. 21 illustrates a plate PL cooperating directly with another surface of the brush B to form a capacitor.

FIG. 21 is similar to FIG. 20, with the exception that the plate PL cooperates with a side of the brush B to form a capacitor, rather than the bottom of the brush B. In both Figures, the plate PL is separated from the brush B by a dielectric.

Figure 22:
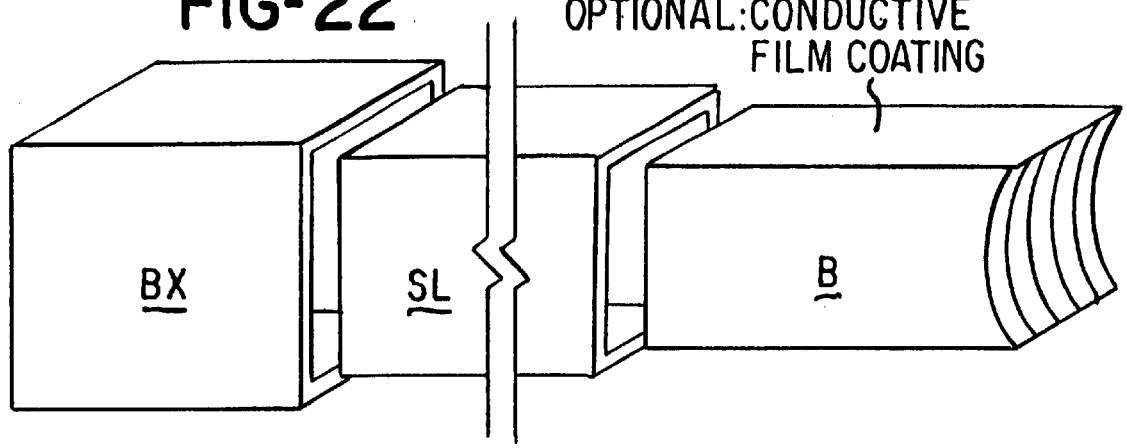
FIG. 22 illustrates the box Bx and brush B of FIG. 18, together with an insulating sleeve SL, in exploded form.

FIG. 22 illustrates the brush B, a dielectric sleeve SL, and the brush box Bx. An optional conductive film may be applied to the brush B, as indicated. These three components are shown assembled in FIG. 23.

Figure 23:
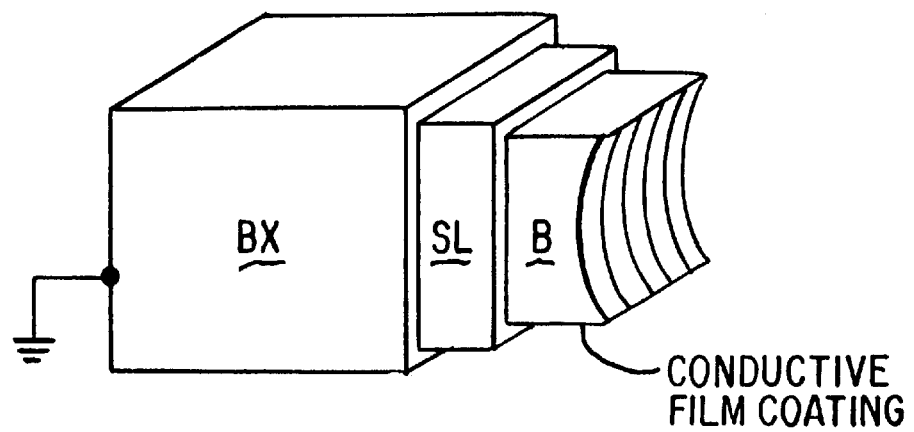
FIG. 23 illustrates the components of FIG. 22, in assembled form.
Figure 25:
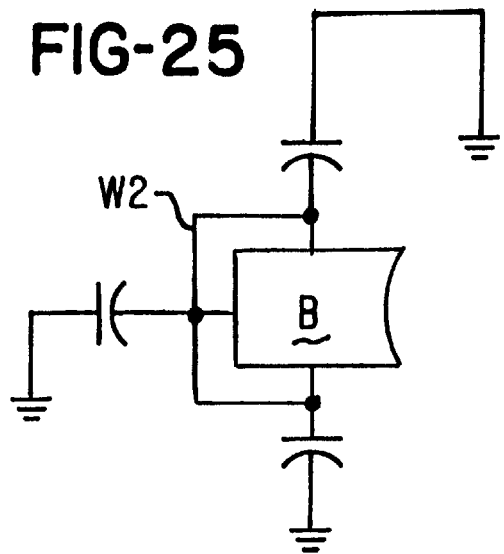
FIG. 25 illustrates a more detailed equivalent circuit of the apparatus of FIG. 23.
Figure 24:
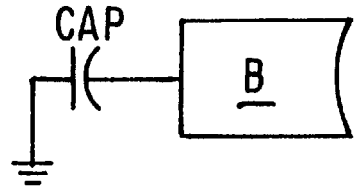
FIG. 24 illustrates a simplified equivalent circuit of the apparatus of FIG. 23.

The assembly provides the electrical properties shown in FIG. 24. The box Bx and the brush B of FIG. 23 form two plates of the capacitor Cap in FIG. 24. FIG. 25 is perhaps a more accurate representation: since every point on the brush in FIG. 23 cooperates with the box Bx in forming a capacitor, multiple capacitors, as in FIG. 25, in effect., connect between the brush B and ground. Further, one plate of each capacitor is connected to ground, and the other plate of each is connected in common, as indicated by wire W2, corresponding to the fact that the surface of the brush B in FIG. 23 is held at a single electrical potential.

Figure 26:
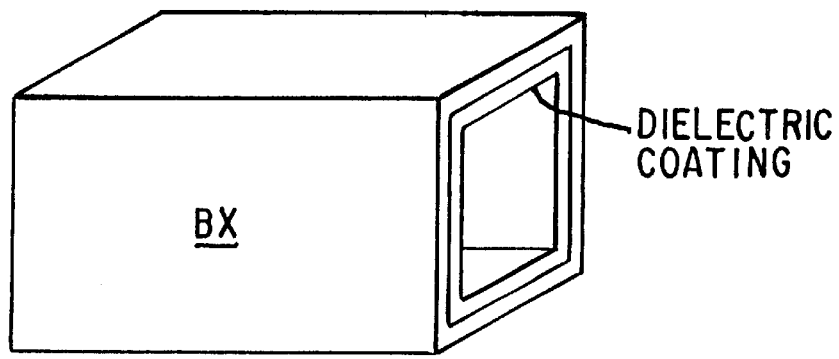
FIGS. 26 and 27 illustrate how the sleeve SL in FIG. 22 can be constructed as either a coating on the box Bx, or a coating on the brush B.
Figure 27:
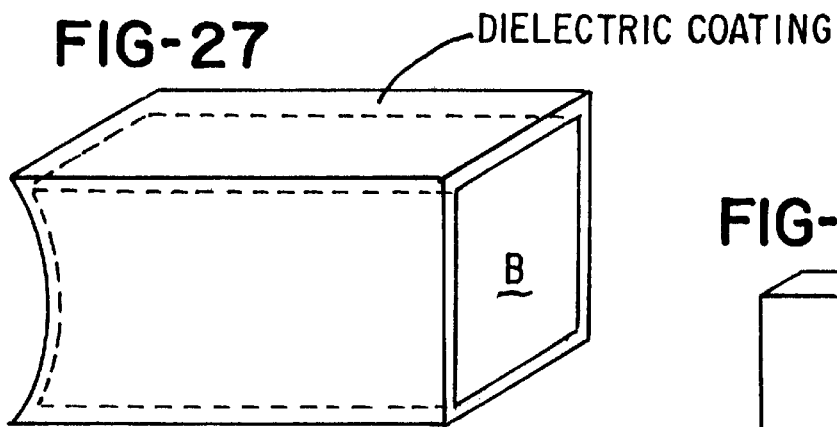

The dielectric sleeve SL in FIG. 22 can take the form of a coating on the inside of the box Bx, as in FIG. 26, or a coating on the outside of the brush B, as in FIG. 27.

Figure 28:
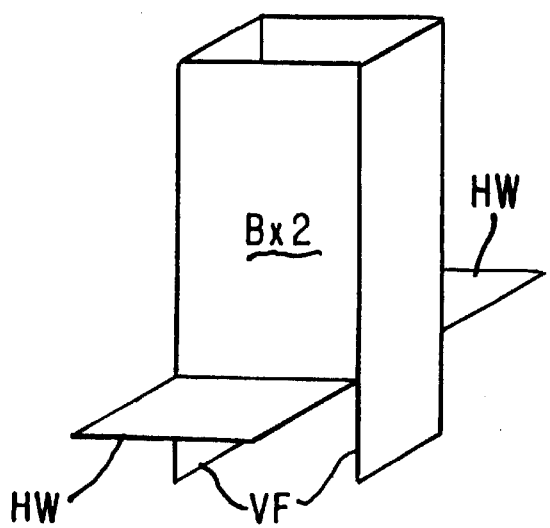
FIG. 28 illustrates another form of the invention.
Figure 29:
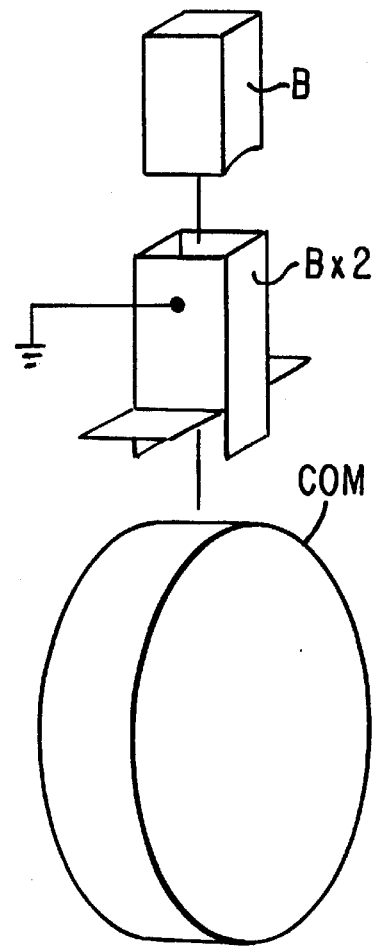
FIG. 29 illustrates the apparatus of FIG. 28, together with a brush B and a commutator drum COM.
Figure 30:
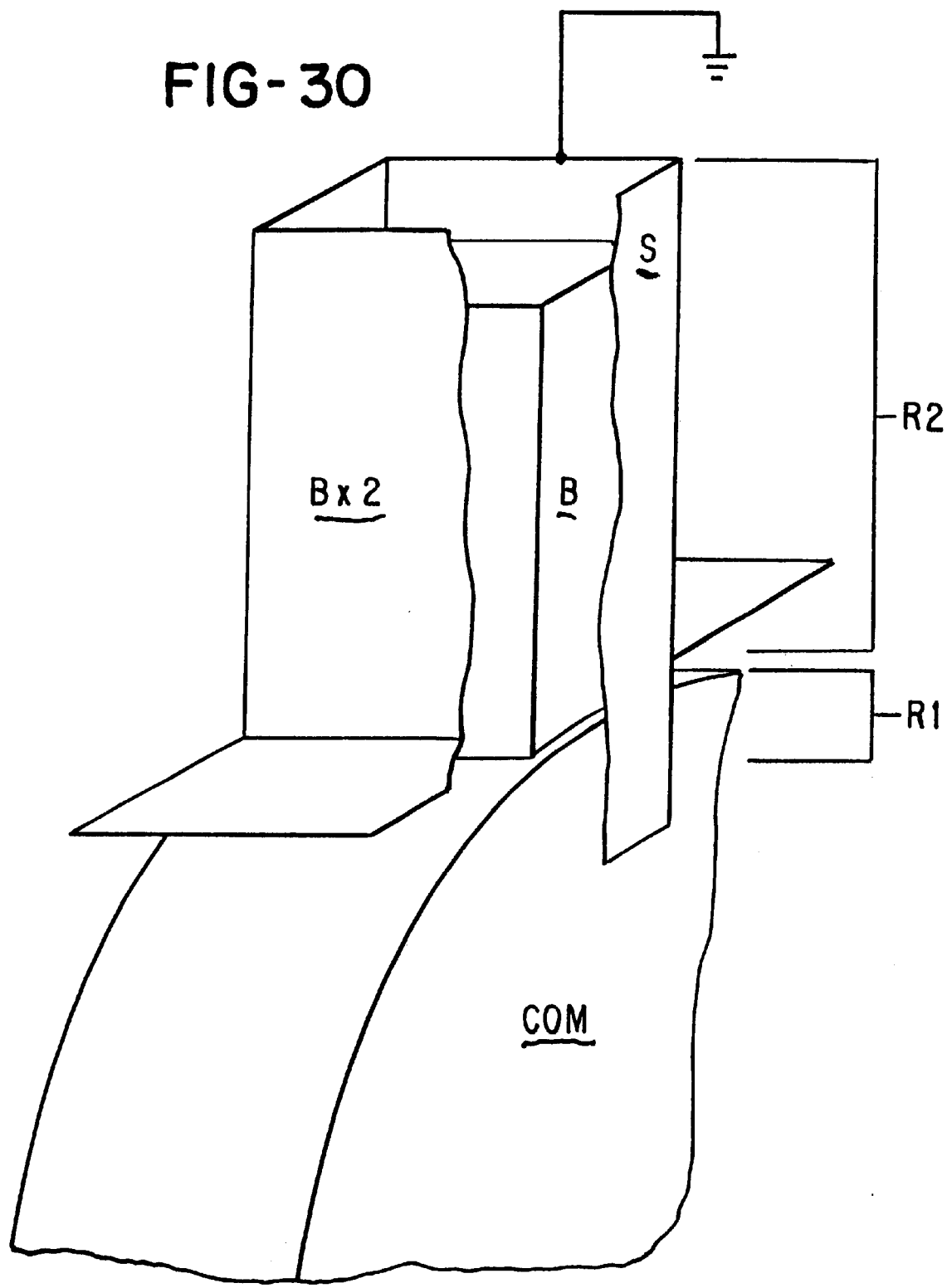
FIG. 30 shows a cutaway view of the components of FIG. 29, in assembled form.

FIG. 28 illustrates a brush box Bx2 having a special configuration. The box Bx2 contains two horizontal wings HW and two vertical flaps VF, all composed of the same material as the box Bx2. FIG. 29 shows the box Bx2, brush B, and commutator drum COM, in exploded form. FIG. 30 shows them in assembled form, but with the box Bx2 partially cut away.

The box Bx2 can be divided into two functional regions, R1 and R2, which are also shown in FIG. 31. FIG. 31 also shows the plasma PL. Region R1, which largely coincides with vertical flap VF, acts as an antenna and picks up radiation emitted by the plasma PL, thereby absorbing that radiation. Region R2 acts as a plate of the capacitors described, which shunt noise currents to ground.

Stated in other words, the same plate P1 shown in FIG. 31 performs two functions, but in different regions. Vertical Flap VF absorbs airborne radiation, converts it into motion of electrons or other charge carriers within the metal of which plate P1 is constructed. Those currents are shunted to ground. Region R2 acts as a plate of a capacitor, and acts as a shunt-to-ground for the noise signals present in the brush B.

FIG. 32 shows the pair of vertical flaps VF, adjacent the plasma PL.

FIG. 33 shows one conception of the operation of the vertical flaps VF: they, together with the brush B and commutator COM, act as a containment vessel for the plasma PL. The only route of escape for airborne radiation lies under horizontal wings HW in FIG. 34. However, those wings HW cooperate with the commutator COM to limit escape to radiation traveling in a specific direction, namely, along the channels formed between the wings HW and the commutator COM.

Figure 35:
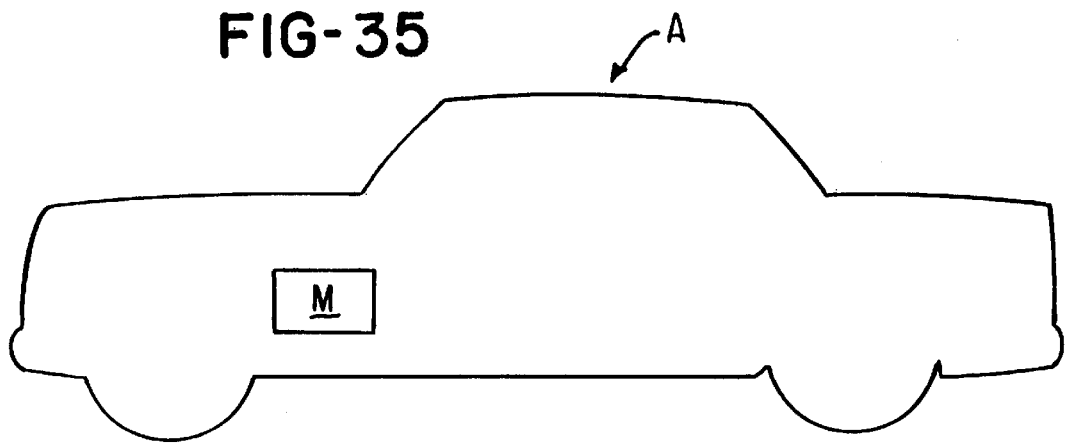
FIG. 35 illustrates one form of the invention.

FIG. 35 illustrates one form of the invention. An automobile A contains a motor M, which contains one, or more, of the brush assemblies described above.

Additional Embodiments

FIG. 38 illustrates two pass-through capacitors C, wherein a tubular plate T surrounds a wire W1 carrying current for the brush B. A dielectric (not shown) insulates the wire W1 from the tubular plate T. Tubular plates T are grounded, as indicated by wire W and the ground symbol.

Region R in FIG. 39 may be filled with a structural polymer, such as epoxy, to bind the two ends E into a unitary structure.

FIGS. 40–42 illustrate one mode of manufacture of the apparatus of FIG. 38. In FIG. 40, tubular plates T are bunched into a cluster. Alternately, in FIG. 41, tubular capacitors TC are bunched into a cluster. The cluster is tightly bound together using a band B. Then, in FIG. 42, the ends E are attached to the banded cluster BC. The structural polymer of FIG. 39 may be added at this time.

In one form of the invention, electrical contact between the tubular plates T is created and maintained solely by the compression force of the band B in FIG. 41.

Figure 43:
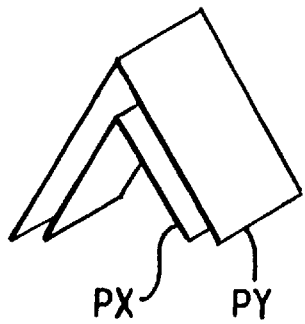
FIGS. 43 and 44 illustrate another form of the invention.
Figure 44:
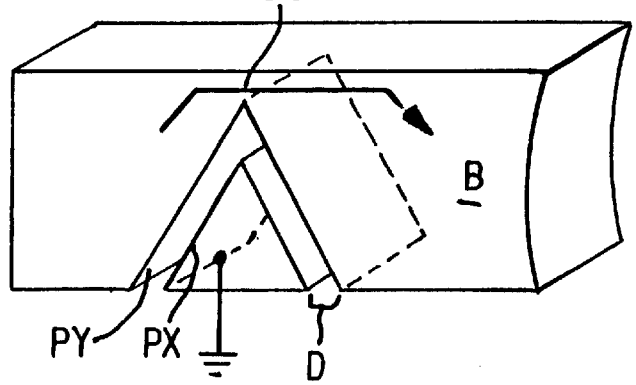

FIGS. 43 and 44 illustrate another embodiment. FIG. 43 illustrates two V-shaped metal plates PX and PY. These plates are inserted into a. matching cut-out within the brush B. Plate PY is in electrical contact with the brush B, and plate PX is in electrical contact with ground. A dielectric D separates the plates.

Figure 45:
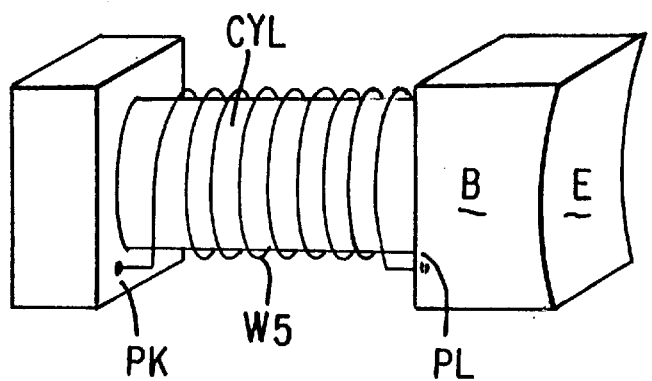
FIG. 45 illustrates a form of the invention in which an inductive noise suppressor is used.

FIG. 45 illustrates an inductor fabricated into the brush B. A coil of wire W5 is connected to the brush B at points PK and PL. The wire W5 is wrapped around a cylinder CYL which is non-conducting, or significantly less conducting than wire W5, so that virtually all current delivered to the end E is carried through the wire W5. Preferably, cylinder CYL has a high permeability, and lossy high frequency characteristics, such as that found in soft ferrite material.

Figure 46:
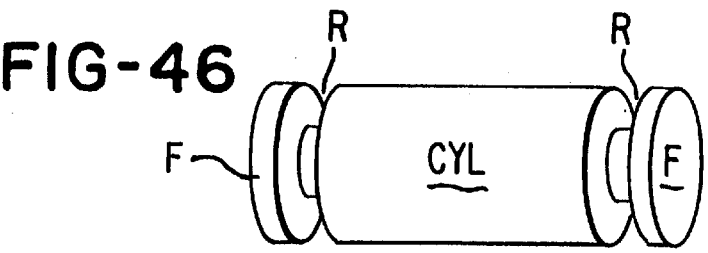
FIGS. 46–49 illustrate one approach to fabricating the apparatus of FIG. 45.
Figure 47:
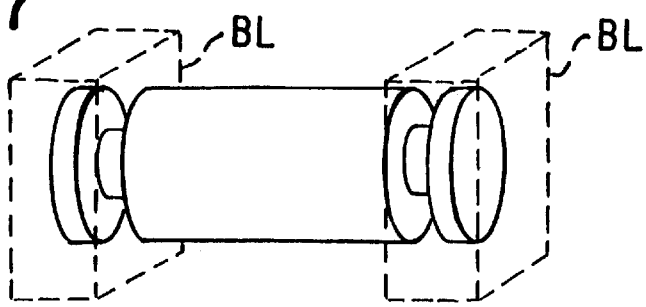
Figure 48:
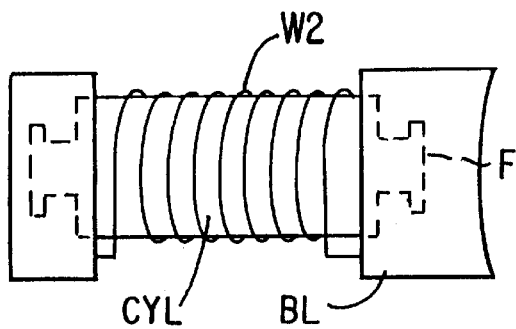
Figure 49:
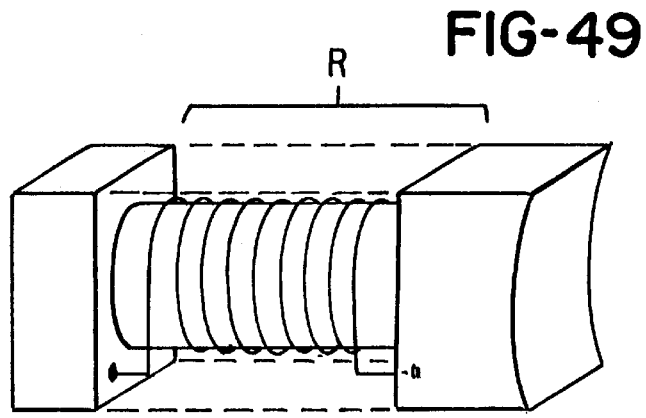

Cylinder CYL can take the form shown in FIG. 46, wherein two flanges F are constructed, and separated from the cylinder CYL by annular recesses R. Conductive blocks BL shown in FIG. 47 are then cast, or sintered, and thereby attached to the flange-recess structures. Adding the wire W2 as in FIG. 48 provides the inductor. Region R in FIG. 49 can be filled with a structural polymer, such as epoxy.

Figure 50:
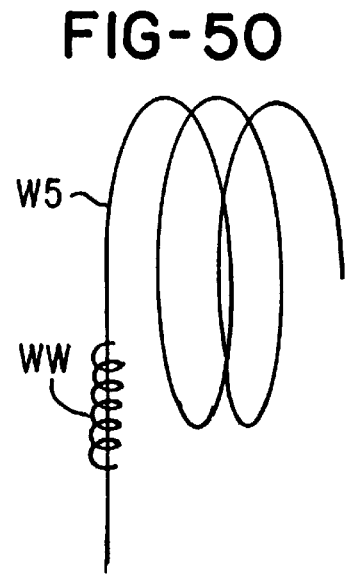
FIG. 50 illustrates a wire W5 supporting another wire WW around it.

To increase the number of turns in the wire, wire W5 of FIG. 45 can act as a carrier, or support, for the wire which actually carries the current, as shown in FIG. 50. The current-carrying wire is wire WW.

Figure 51:
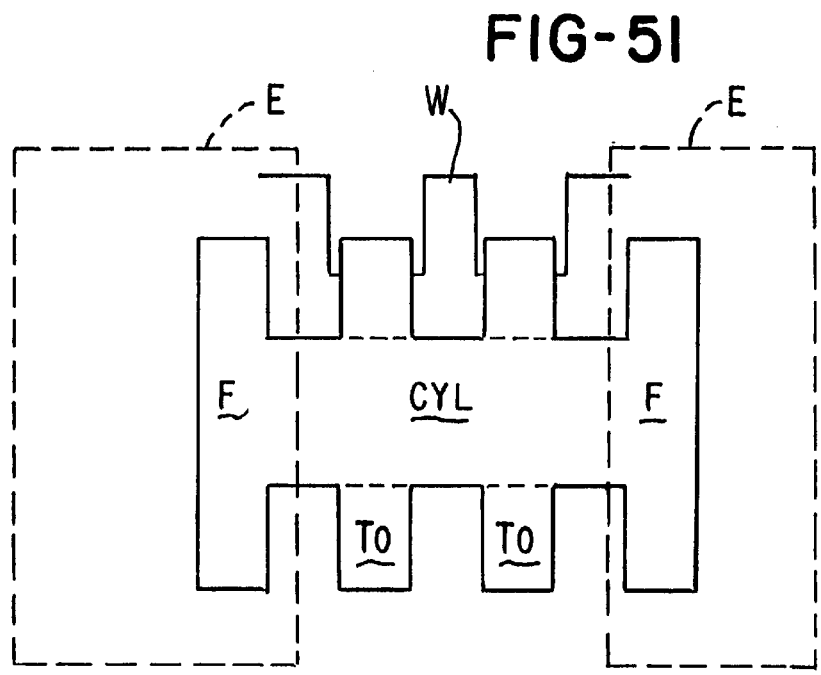
FIGS. 51, 52, and 52A illustrate another form of the invention.
Figure 52:
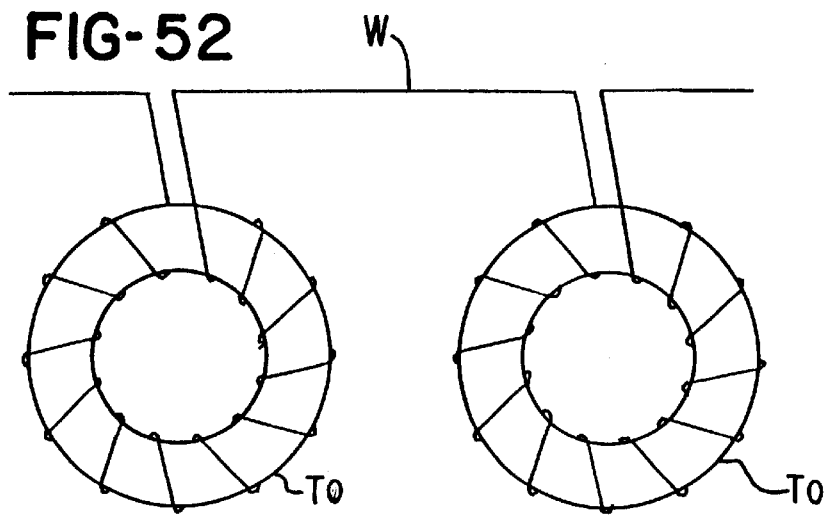
Figure 52A:
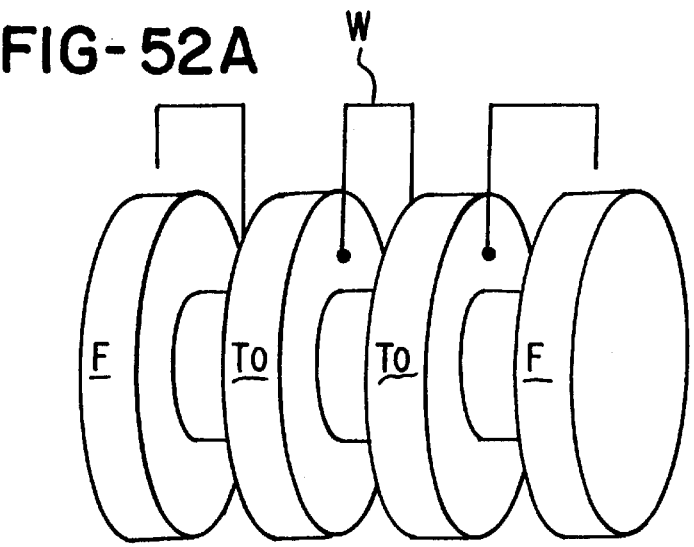

FIG. 51 illustrates another form of the invention. The high-permeability cylinder CYL of FIG. 46 is shown, together with its flanges F. That cylinder CYL carries two toroidal inductors To, which are illustrated in FIG. 52. The toroidal inductors To are connected in series by wire W. That wire W connects the ends E of FIG. 51 in series.

In this example, it is perhaps not necessary that the cylinder CYL be constructed of a high-permeability material, because the toroids To contain such a material.

FIG. 52 illustrates a partial perspective view of the structure of FIG. 51.

Figure 53:
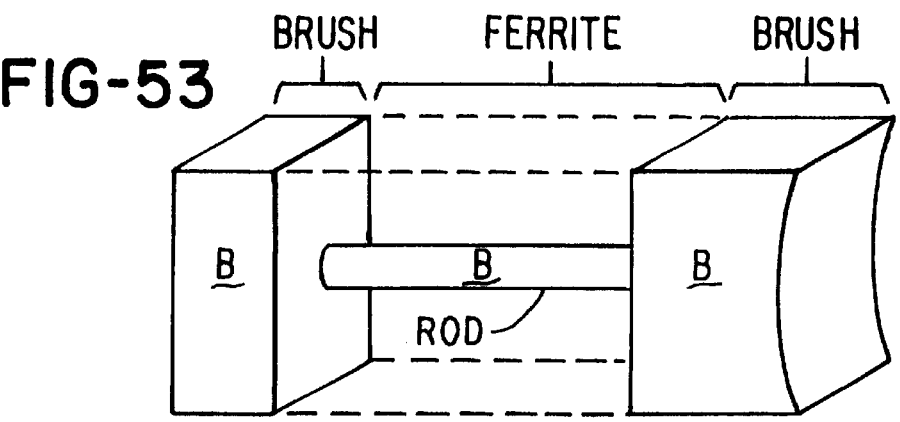
FIGS. 53–56 illustrate four variations in constructing an inductor which connects two ends of a brush.

FIG. 53 illustrates another form of the invention. All regions labeled B are constructed of the brush material, which is, for example, sintered carbon-copper. Alternately, the rod labeled ROD may be constructed of a higher-conductivity material. A ferrite material surrounds to rod ROD.

Figure 54:
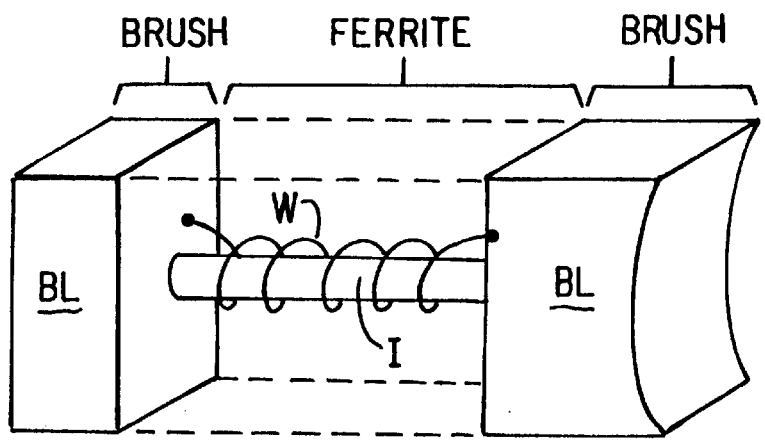

In FIG. 54, blocks BL are connected by an insulating rod I. A coil of wire W is wrapped around the insulating rod I, forming an inductor. The wire W is encased within a ferrite-bearing matrix labeled FERRITE.

Figure 55:
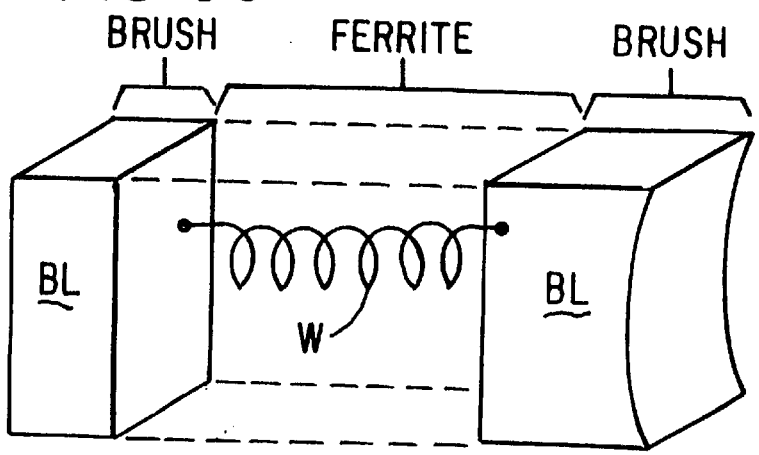

It is not strictly necessary that insulating rod I be provided. That rod functions primarily to support the two blocks BL during fabrication. If blocks BL and wire coil W were independently supported during fabrication then, after the addition of the ferrite matrix, the matrix would support the blocks BL together with the wire W, as in FIG. 55.

Figure 56:
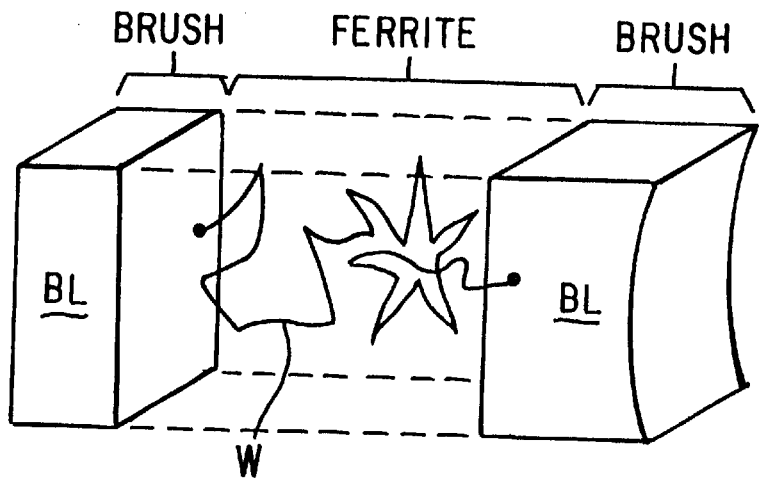

FIG. 56 illustrates another form of the invention. The wire W, encased in a ferrite-nearing matrix FERRITE, takes an arbitrary serpentine path between the blocks. Preferably, the length of the wire W is significantly greater than the straight-line distance between the blocks BL. For example, the wire may be 5, 10, 20, or 100 times that distance.

Combination of Inductor with Capacitor

Figure 57:
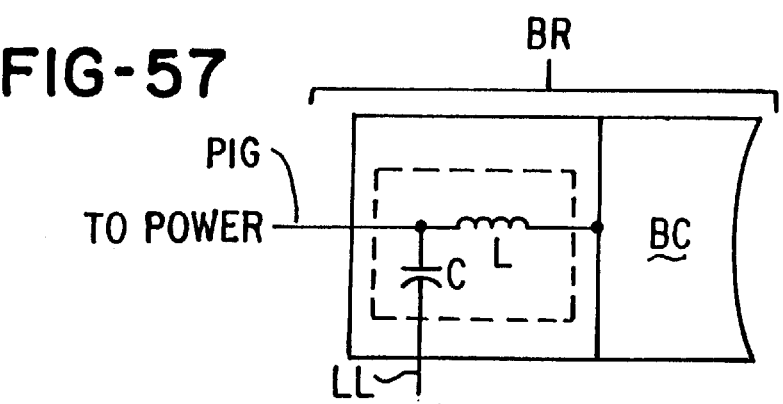
FIG. 57 illustrates a motor brush containing an integrally constructed LC noise filter.

FIG. 57 illustrates a brush structure BR, which contains an LC filter comprising capacitor C and inductor L, together with a conductive region BC. One approach to fabricating such a structure will be explained.

Figure 58:
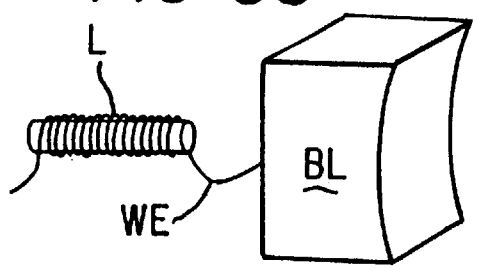
Figure 59:
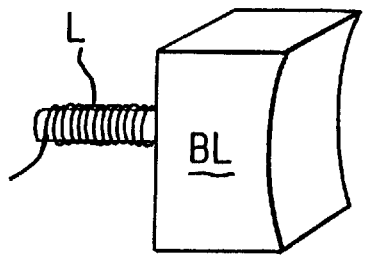

In FIG. 58, one wire WE of an inductor L is connected to a carbon block BL. In FIG. 59, the body of the inductor L is fastened to the block BL.

Figure 60:
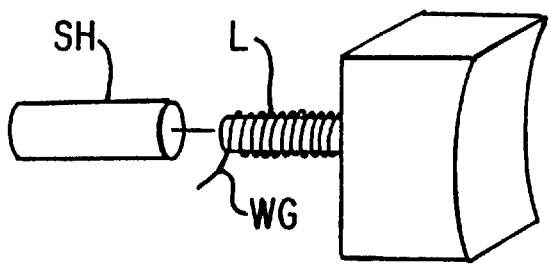
Figure 61:
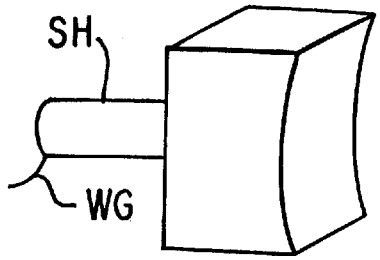

In FIG. 60, an insulating sheath SH is brought adjacent the inductor L, and, in FIG. 61, that sheath SH is placed around the inductor L. The sheath SH may take the form of an insulative coating. Alternately, the sheath SH may not be necessary, if the wires comprising the inductor L bear sufficiently rugged insulation.

In FIG. 61, wire WG remains extending from the inductor.

Figure 62:
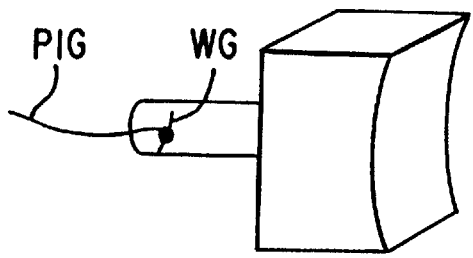

In FIG. 62, the wire WG is fastened to a pigtail PIG, to which current will be later delivered in operation of the motor which will contain the brush.

Figure 63:
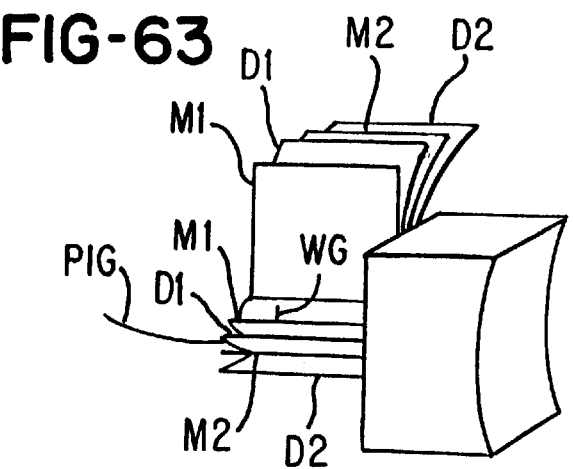

In FIG. 63, four layers of film are wrapped about the sheath SH, in the manner described above, in connection with FIGS. 9–15. These layers include metal layers M1 and M2, and dielectric layers D1 and D2. The inner metal layer M1 is kept in electrical contact with wire WG, and thus with the pigtail PIG.

In FIG. 64, metal layer M2 is shown as the outer layer. Ordinarily, dielectric D2 would form the outer layer, but that layer was cut away, on the non-visible side of FIG. 64. Optionally, as indicated, a conductive outer sheath OSH can be attached to the outer conductor M2.

FIG. 65 indicates that a wire WH is attached to the outer conductor M2, and will be grounded, as indicated by the ground symbol.

In FIG. 66, a structural matrix MX, such as epoxy, encases the outer metal M2. The pigtail PIG extends from the matrix MX. Preferably, the matrix MX is of the same size, and shape, in cross-section, as the block BL so that the entire structure can slide through a conformal housing, or sleeve (not shown), commonly called a brush box.

As shown in FIG. 67, one or more stiffening rods ROD2 can be inserted into the block BL, to more securely attach the matrix MX to the block BL.

Additional Embodiments

FIG. 69 shows a brush box BX for receiving a pigtail PIG, and containing brush BR. The box BX is constructed of a ferrite material, as indicated by the small dots, or is constructed of a ferrite-containing material.

FIG. 70 shows a box BX, which is constructed of two different materials. The left side is constructed of a metal, or other conductor, as indicated, and the right side is constructed of an insulator, also as indicated. Brush BR was described above, and is to be installed within the box BX. A capacitor CAP shunts the metallic part of the box BX to ground.

FIG. 71 shows a similar arrangement to that of FIG. 70, but with two modifications. One, the capacitor CAP in FIG. 70 is now replaced by a direct shunt to ground in FIG. 71. Two, a dielectric sleeve DI is added in FIG. 71. With this arrangement, the part of the brush which is contained within the metallic part of the box BX is capacitively coupled to ground: that part of the brush acts as one "plate," the metallic box acts as the other "plate," and the dielectric sleeve DI acts as the insulator. The other part of the brush, namely, that within the insulative part of the box BX, is coupled to the part of the brush within the metallic part of the box as discussed above.

Of course, the part of the dielectric sleeve DI which is contained within the insulative part of the box BX does not serve an insulation function, but a structural function. Dielectric sleeve DI could be fabricated so that it resides solely within the metallic part of the box BX, and the insulative part of box BX could be fabricated so that its internal dimensions match that of the dielectric sleeve DI.

Application of the principles described above are not limited to electric-motors. Electromechanical relays are subject to arcing, as are brushes in motors. FIG. 72 shows application of some of the principles to a relay.

When current is applied to a coil C, a magnetic field (not shown) moves reed RD. FIG. 72 shows two boxes BX, of the type described in FIG. 69. However, conductive contacts CT in FIG. 72 replace the brush BR of FIG. 69.

In the more general case, most, if not all, of the structures described herein can be applied to relays as shown in FIG. 72. The brushes described above are used as relay contacts, and the noise-suppression approaches are used to suppress noise generated by electrical arcing.

In this modification, it may be desirable to fabricate the contacts CT so that they are not movable within the box BX. In another modification, the contacts CT are constructed of a material suitable for relays, such as a metal. In a third modification, the face F of the contact is hemispherical, as shown in contact CTA. The hemispherical shape removes sharp edges, which create high electric fields, which promote dielectric breakdown of the air, and consequent arcing.

Additional Considerations

1. It may be thought that the layers of capacitors in FIG. 15 act as capacitors-in-series, and thereby reduce the total capacitance. However, that is not so.

Figure 36:
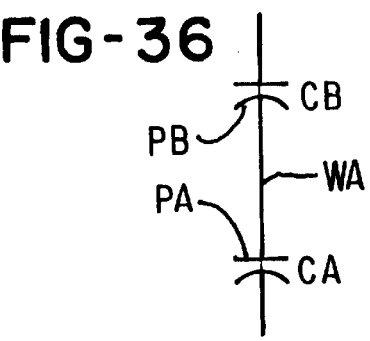
FIG. 36 illustrates two capacitors in series.

FIG. 36 shows two capacitors in series. Plates PA and PB are connected by wire WA, and are thus held at the same voltage. That fact, together with the basic equation C=eA/t, can be used to show that the total capacitance obtained will be given by the equation 1/Ctot=1/CA+1/CB. Total capacitance, Ctot, will be less than either CA or CB.

However, under the invention, the capacitors are not actually in series. For example, it may appear that plates MA and MB in FIG. 37 correspond, in principle, to plates PA and PB in FIG. 36. That is not so. Plates MA and MB are at different potentials, and are not connected electrically.

2. "Brush" is a term of art. Motor brushes are generally constructed of blocks of carbon or graphite, sometimes with copper added. But the term "brush" is used for historical reasons: No bristles are present on the brushes in question.

3. A computation of the inductance available in an apparatus of the type shown in FIG. 45 will be given. If S is the cross-sectional area of the cylinder CYL, and if N turns of the wire W5 exist per length b of the coil, then the inductance is given by the expression $$L=mu(s/b)N*N$$

wherein the expression N*N means N-squared, and mu is the permeability of the cylinder CYL. The permeability of vacuum equals 4* PI*10E-7 Henries/meter.

If an inductor is to be fabricated which will fit inside the brush shown in FIG. 15, then the dimensions and parameters illustrated in FIG. 68 may be assumed: (1) a core diameter of ¼ inch, (2) a length of 1 inch, and (3) a radial thickness of the coil itself of ⅛ inch.

28 gauge enameled magnet wire has an outer diameter of about 15 mils. Thus, in one linear inch, about 65 loops of wire can be inserted. FIG. 68 illustrates the loops. Further, multiple layers of wire will be used, to consume the available ⅛ inch coil height. Eight layers of 15-mil wire will be 120 mils thick, which is nearly ⅛ inch. The total number of loops is 65*8, or 520.

The inductance of the coil just described, if wrapped about a vacuum, is given by $$(4*PI*10E\text{-}7 \text{ H/m})*(\tfrac{1}{39} \text{ m/inch})*(PI*\tfrac{1}{8}*\tfrac{1}{8}*\tfrac{1}{1} \text{ inch})*(520*520)=0.00014 \text{ Henry}.$$

Figure 14:
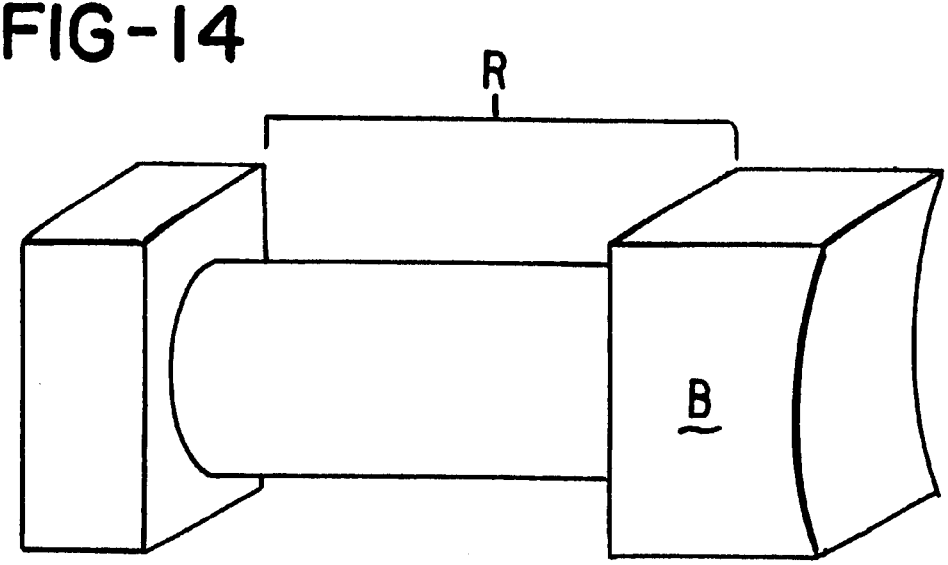

If, instead of being wrapped about a vacuum, the coils are wrapped about a material having a relative permeability of 10 or 1,000, which are readily available, then it is clear that inductances in the range of 0.14 Henries are possible to encase within the structure of FIG. 14.

To confirm the preceding estimate, the Inventors point out that commercially available inductors are available, for example, from J. W. Miller Magnetics. Model number 70F-471-AF is cylindrical, and, at 0.025 MHz, has an inductance of 470,000 micro-Henries, or 0.47 Henry. This inductor is about 0.6 inches in diameter, and about 0.5 inches long. This inductor will fit within the brush B shown in FIG. 14.

4. The structure of FIG. 57 is significant in the respect that it consists of the following elements: (1) a brush means BC for contacting a commutator (not shown), (2) a pigtail PIG, for delivering current to the brush means, (3) an inductor L in series with the pigtail PIG and the brush means BC, (4) a capacitor connecting between the pigtail PIG, and external lead LL for grounding, and (5) the matrix MX, which contains the capacitor C and inductor L.

These elements perform two functions. One, they deliver current to the brush BC, for delivery to a motor. Two, they include an LC noise filter, which deters high-frequency signals picked up by the brush BC from reaching the pigtail PIG. The matrix Mx performs a passive function, in supporting the capacitor C and the inductor L, an attaching them to the brush BC.

5. The individual components shown in FIG. 57 are not usable as discrete elements within a radio-frequency circuit. That is, it may appear that (1) the leads of the capacitor C are externally accessible and (2), for that reason, the capacitor C could be used in a radio-frequency circuit.

However, that is not so, at least for ordinary usage. The stray inductances and capacitances presented by the elements attached to the capacitor C will prevent such a usage. Restated, the capacitor C is not actually a discrete capacitor of value C, nor do the external leads connecting to that capacitor C behave as though connected to a pure capacitor C. Again, the stray inductances and capacitances of the overall structure prevent such behavior.

This comment also applies to the inductor L.

In addition, the overall size of the apparatus of FIG. 57 would preclude usage of either the capacitor C or inductor L, by themselves, in a radio-frequency circuit.

Further, as explained above, the capacitor C and inductor L are encased in matrix Mx, which may be a ferrite-filled epoxy. Removal of either the capacitor C or the inductor L would be very time-consuming, and would also carry no guarantee that the removed component would remain intact after the removal process. Thus, no person would attempt to utilize either of these elements for another purpose, other than as a filter system for the brush shown.

Therefore, in one form of the invention, once the capacitor C and inductor L have been installed within the brush BR, their practical application for other purposes has terminated. They have become dedicated to the brush system. When the brush wears out, they will be discarded. It is not practical to attempt to recover them for another purpose. It is more practical to purchase other capacitors or inductors for the other purposes.

While the methods herein described, and the forms of apparatus for carrying these methods into effect, constitute preferred embodiments of this invention, it is to be understood that the invention is not limited to these precise methods and forms of apparatus, and that changes may be made in either without departing from the scope of the invention, which is defined in the appended claims.

What is claimed is:

1. A brush for an electric motor, comprising:

a) a block for contacting a commutator;

b) a plurality of conductors extending from the block; and c) a conductive sheath surrounding each conductor and connected to ground, wherein at least two of said plurality of conductors forms a capacitor.

2. A brush for an electric motor, comprising:

a) a first contact for contacting a commutator in the motor and a second contact in opposed relation to the first contact, said first contact and said second contact both comprising substantially the same cross-sectional shape and each of said first and second contacts comprising a shape that substantially complements the shape of a passageway of a brush box into which the brush will be positioned;

b) an inductor connected between said first and second contacts; and c) a block of material which
   i) supports and couples said first and second contacts and
   ii) encases said inductor.

3. The brush according to claim 2, wherein the inductor comprises a wire of serpentine shape.

4. The brush according to claim 3, wherein the inductor is encased in a ferrite matrix.

5. A brush for an electric motor, comprising:
   a) a contact for contacting a commutator in the motor;
   b) an inductor connecting with said contact, and
   c) a block of material which
      i.) supports said contact and
      ii.) encases said inductor; and
   wherein said inductor comprises a coil of wire surrounding a core having a relative permeability exceeding a permeability of air.

6. The brush according to claim 2 and further comprising:
   d) a capacitor
      i) connecting between said contact and an external lead and
      ii) which is encased in said block.

7. A brush for an electric motor, comprising:
   a) a first contact for contacting a commutator in the motor and a second contact in opposed relation to the first contact, said first contact and said second contact both comprising substantially the same cross-sectional shape and each of said first and second contacts comprising a shape that substantially complements the same of a passageway of a brush box into which the brush will be positioned;
   b) an inductor connected between said first and said second contacts;
   c) a block of material which
      i.) supports and couples said first and second contacts and
      ii.) encases said inductor; and
   d) a capacitor which
      i.) connects between said contact and an external lead and
      ii.) is encased in said block.

8. A brush for an electric motor, consisting essentially of:
   a) a first contact for contacting a commutator with a motor and a second contact in opposed relation to the first contact, said first contact and said second contact both comprising a shape that substantially complements the shape of a passageway of a brush box into which the brush will be positioned;
   b) a power connector (PIG);
   c) an LC noise filter for deterring noise signals received by the contact from reaching the power connector; and
   d) a matrix supporting and coupling said first and second contacts, power connector, and LC noise filter.

9. A method of constructing a brush for a motor, comprising the following steps:
   a) providing a contact for contacting a commutator; and
   b) attaching a filter, comprising an inductor and a capacitor, to the contact in a manner which precludes usage either the inductor or the capacitor individually in another radio-frequency circuit.

10. A brush assembly for an electric motor, comprising:
    a) a generally dumbbell-shaped brush, having two ends of large diameter, connected by a shaft of small diameter;
    b) a mass of ferrite-bearing material surrounding the shaft;
    c) a brush box within which the brush is slidably engaged, which includes
       i) a conductive region which is capacitively coupled to ground; and
       ii) an insulative region.

11. The assembly according to claim 10, wherein the metallic region is farther from the face of the brush than is the insulative region.

12. A brush assembly for an electric motor, comprising:
    a) a generally dumbbell-shaped brush, having two ends of large diameter, connected by a shaft of small diameter;
    b) a mass of ferrite-bearing material surrounding the shaft;
    c) a brush box within which the brush is slidably engaged, which includes
       i) a conductive region; and
       ii) an insulative region.

13. The assembly according to claim 10, wherein the metallic region is farther from the face of the brush than is the insulative region.

* * * * *